(12) United States Patent
Yamada

(10) Patent No.: US 9,116,325 B2
(45) Date of Patent: Aug. 25, 2015

(54) IMAGING LENS SYSTEM

(71) Applicant: Konica Minolta, Inc., Tokyo (JP)

(72) Inventor: Keiko Yamada, Sakai (JP)

(73) Assignee: KONICA MINOLTA, INC. (JP)

(*) Notice: Subject to any disclaimer, the term of this patent is extended or adjusted under 35 U.S.C. 154(b) by 0 days.

(21) Appl. No.: 13/893,806

(22) Filed: May 14, 2013

(65) Prior Publication Data

US 2013/0301147 A1 Nov. 14, 2013

(30) Foreign Application Priority Data

May 14, 2012 (JP) .................................. 2012-110416

(51) Int. Cl.
*G02B 9/60* (2006.01)
*G02B 13/00* (2006.01)

(52) U.S. Cl.
CPC .............. *G02B 9/60* (2013.01); *G02B 13/0045* (2013.01)

(58) Field of Classification Search
CPC .............. G02B 9/60; G02B 9/62; G02B 9/64; G02B 13/0045
USPC .................. 359/713, 714, 754–758, 763, 764
See application file for complete search history.

(56) References Cited

U.S. PATENT DOCUMENTS

| 2010/0253829 A1 | 10/2010 | Shinohara | |
|---|---|---|---|
| 2010/0254029 A1 | 10/2010 | Shinohara | |
| 2011/0310287 A1* | 12/2011 | Ohtsu | 348/340 |
| 2013/0033637 A1* | 2/2013 | Sano | 348/340 |

FOREIGN PATENT DOCUMENTS

| JP | 2010-262269 A | 11/2010 |
|---|---|---|
| JP | 2012-8164 A | 1/2012 |

OTHER PUBLICATIONS

Office Action corresponding to Taiwan Patent Application No. 102115705; Date of Mailing: Sep. 18, 2014, with English translation.

* cited by examiner

*Primary Examiner* — Darryl J Collins
(74) *Attorney, Agent, or Firm* — Cantor Colburn LLP

(57) ABSTRACT

An imaging lens system includes, from the object side, an aperture stop, a positive first lens convex to the object side, a negative second lens, a positive third lens convex to the object side, a positive meniscus fourth lens convex to the image side, and a negative biconcave fifth lens, and fulfills the conditional formulae $0.8 < f/f1 < 1.30$, $0.5 < f4/f1 < 0.90$, $0.6 < d4/d3 < 2.0$, and $0.80 < R3\_1/f < 2.20$, where f is the focal length of the entire imaging lens system, f1 and f4 are the focal lengths of the first and fourth lenses, d3 is the axial thickness of the second lens, d4 is the axial aerial distance between the second and third lenses, and R3_1 is the radius of curvature of the object-side surface of the third lens on the optical axis.

20 Claims, 11 Drawing Sheets

EX1

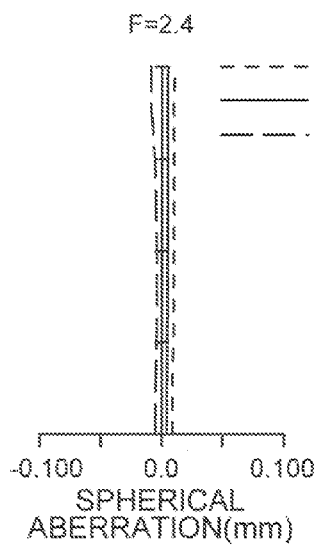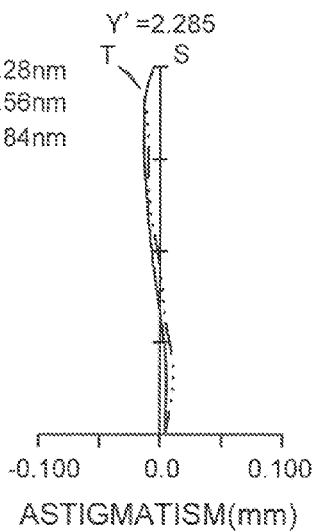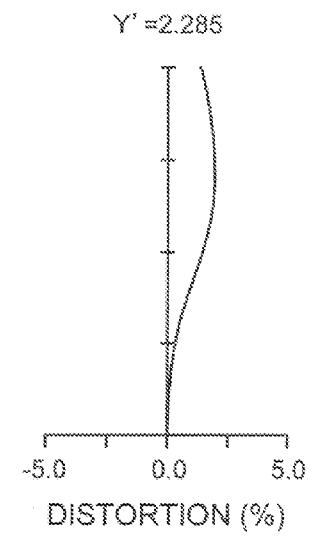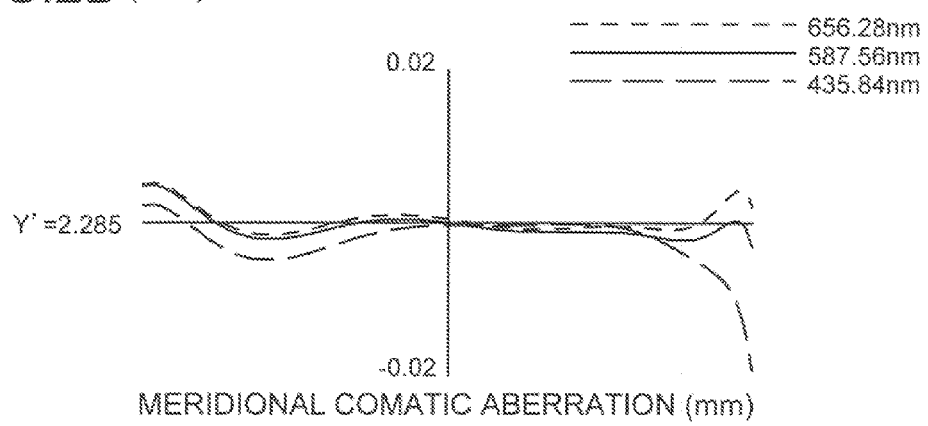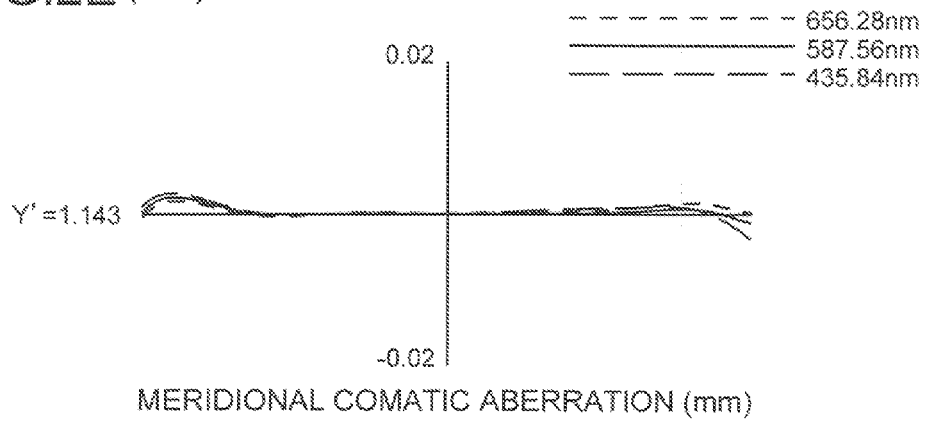

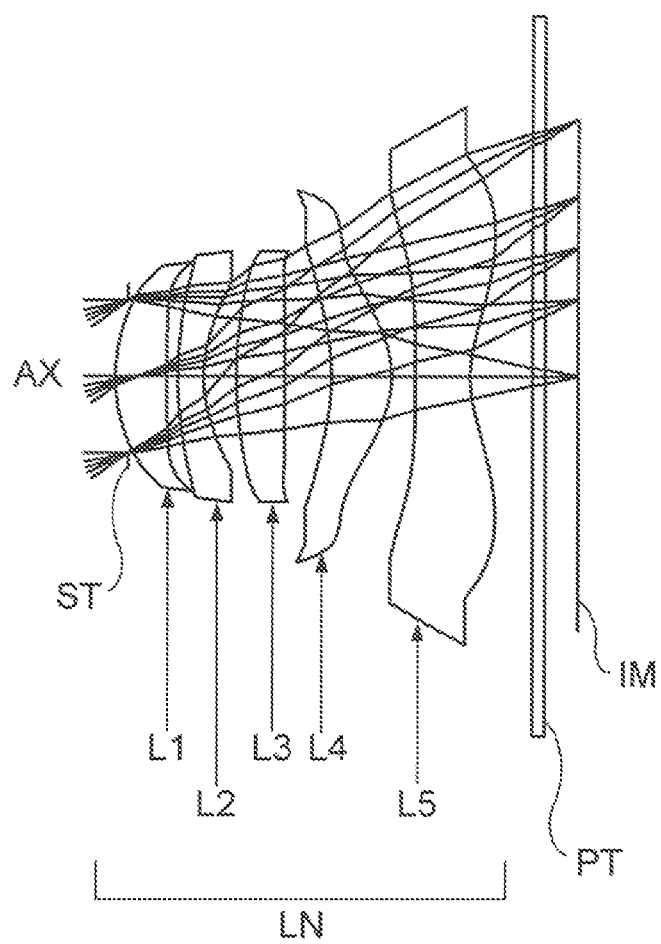

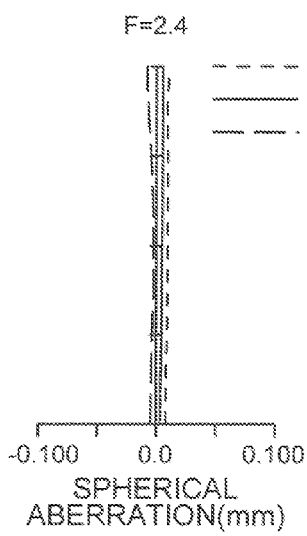
FIG.4A (EX2)
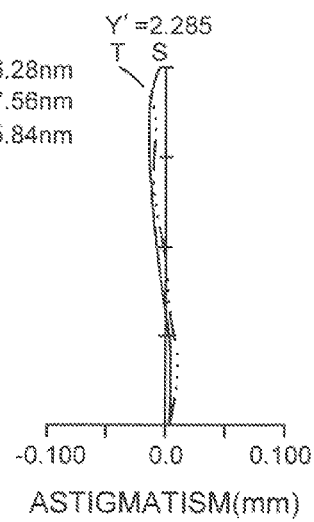
FIG.4B (EX2)
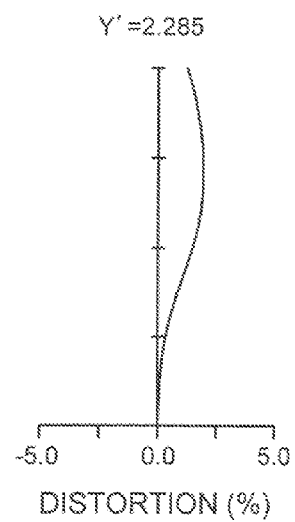
FIG.4C (EX2)
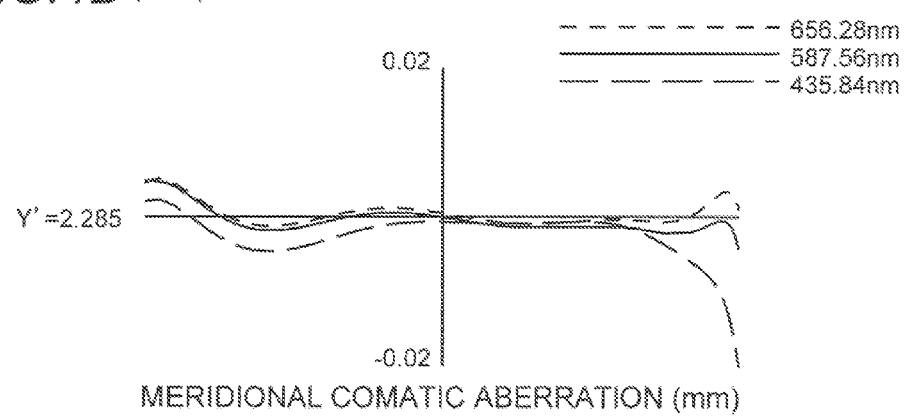
FIG.4D (EX2)
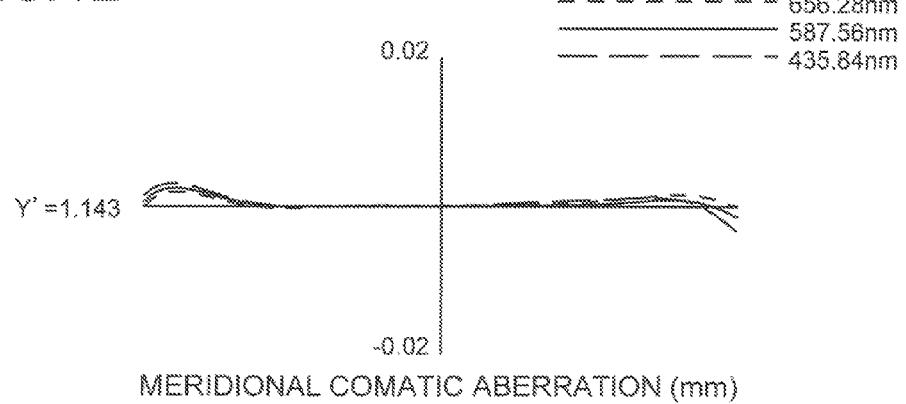
FIG.4E (EX2)

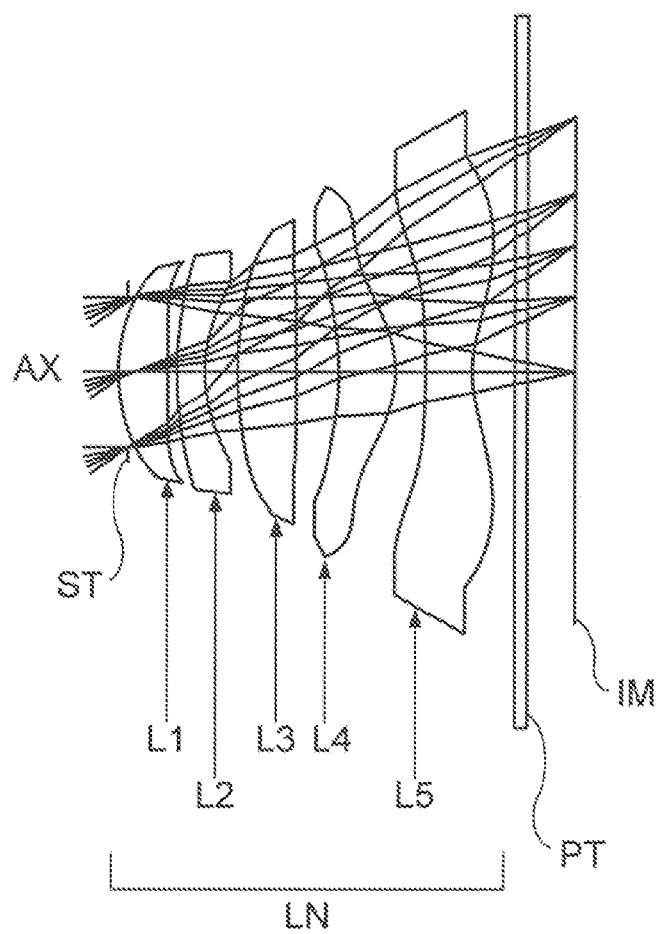

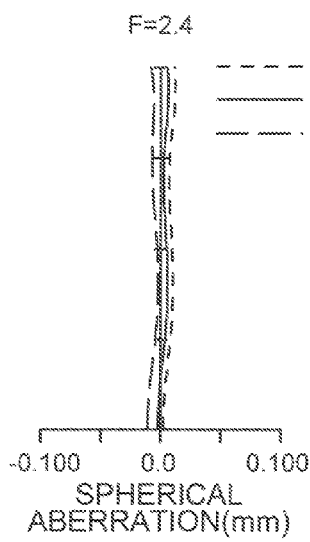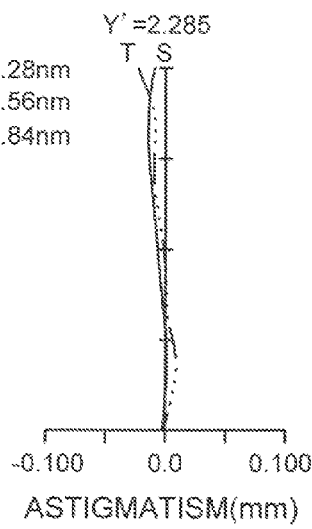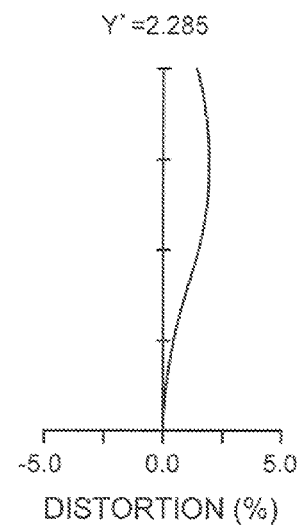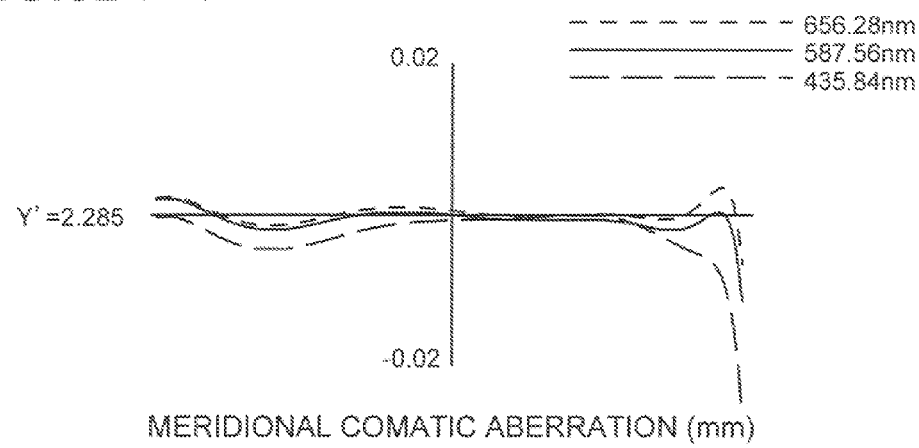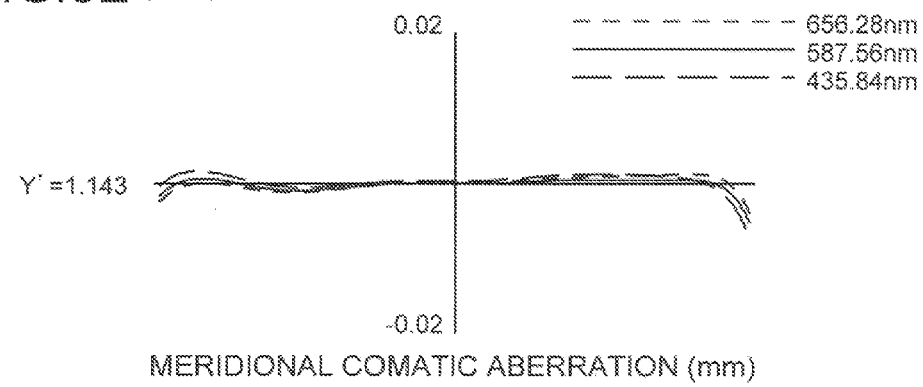

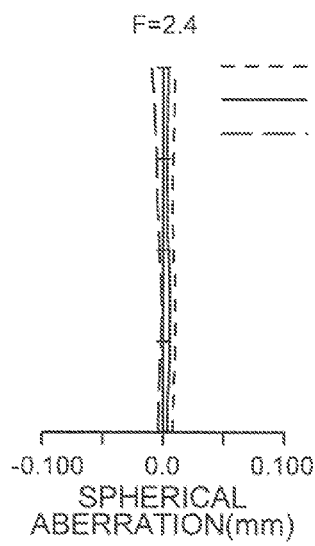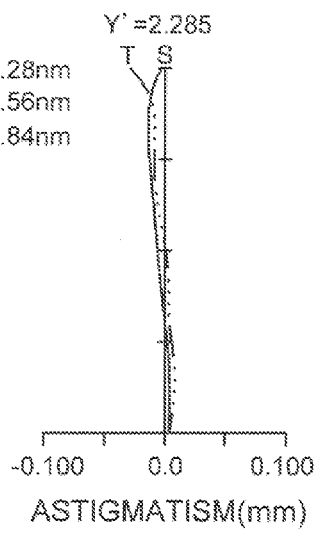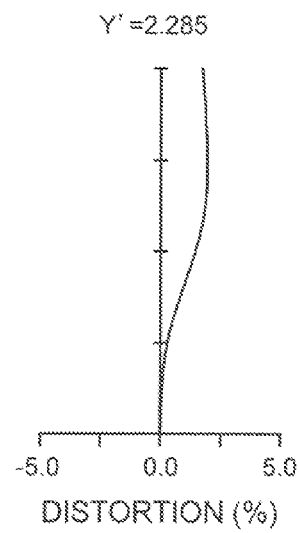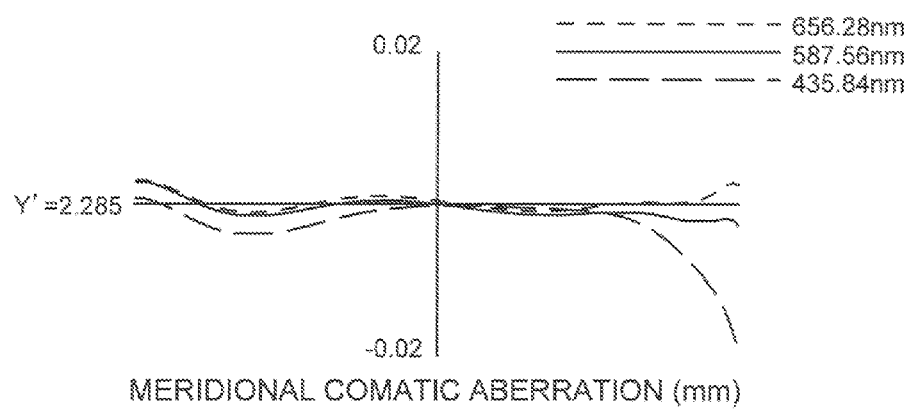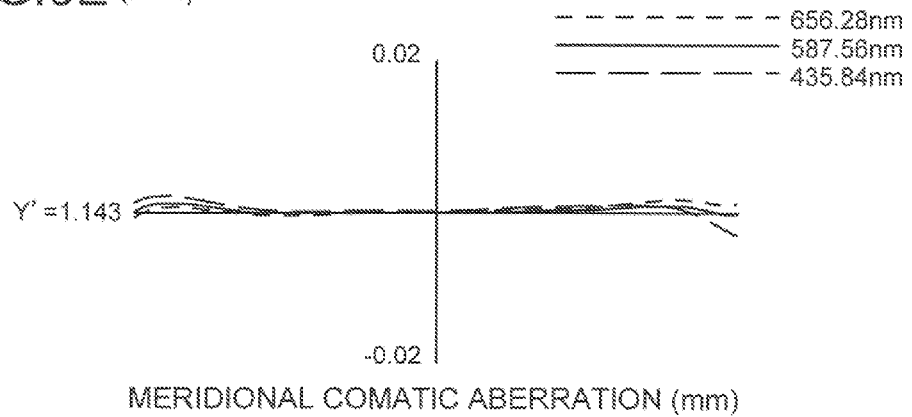

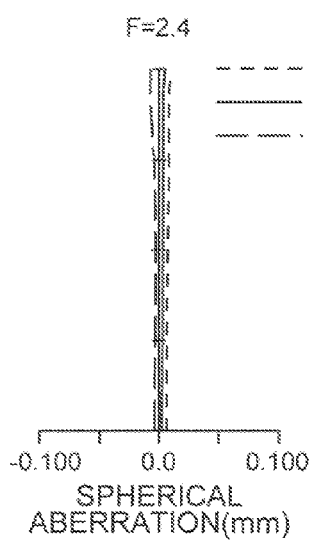
FIG.10A (EX5)
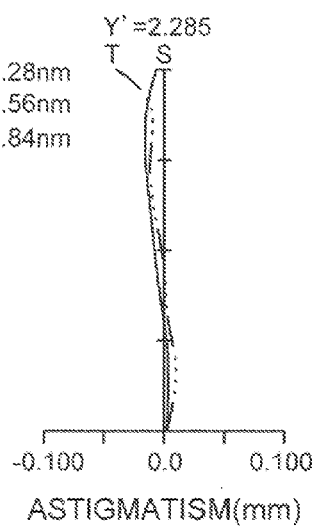
FIG.10B (EX5)
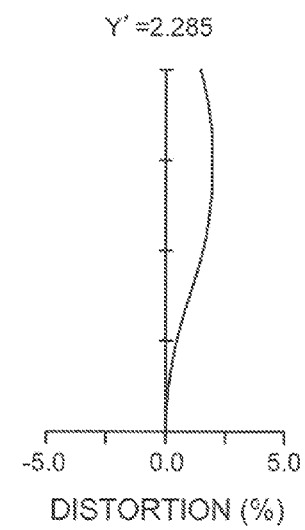
FIG.10C (EX5)
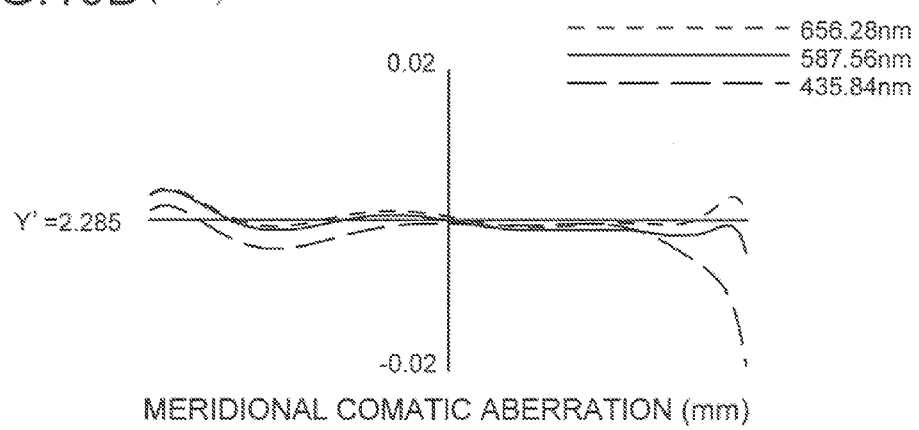
FIG.10D (EX5)
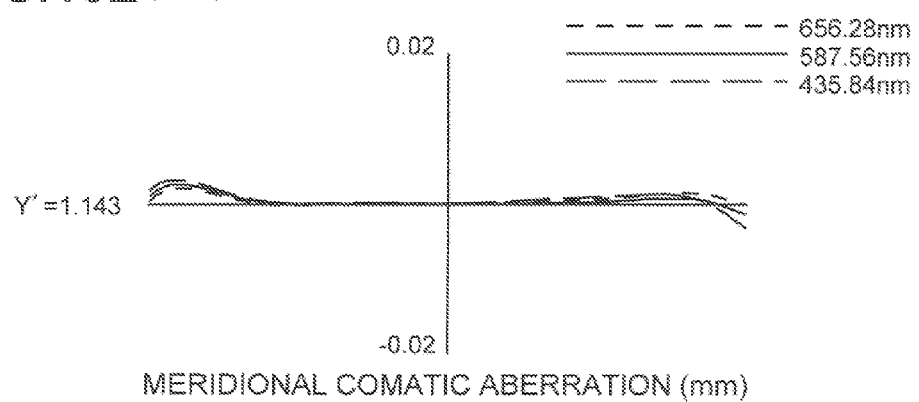
FIG.10E (EX5)

IMAGING LENS SYSTEM

The present application is based on, and claims priority from, Japanese Patent Application No. 2012-110416, filed on May 14, 2012, the disclosure of which is hereby incorporated by reference herein in its entirety.

BACKGROUND OF THE INVENTION

1. Field of the Invention

The present invention relates to imaging lens systems. More particularly, the present invention relates to an imaging optical device that acquires an image of a subject by use of an image sensing device (for example, a solid-state image sensing device such as a CCD (charge-coupled device) image sensor or a CMOS (complementary metal-oxide semiconductor) image sensor), a digital device that incorporates such an imaging optical device so as to be equipped with an image input function, and a compact imaging lens system that forms an optical image of the subject on the light receiving surface of the image sensing device.

2. Description of Related Art

It is today common to incorporate an imaging optical device employing a solid-state image sensing device such as a CCD image sensor or a CMOS image sensor in portable terminals. With the spread of such portable terminals, with a view to obtaining higher-quality images, portable terminals incorporating imaging optical devices employing image sensing devices with increasingly large numbers of pixels are being supplied to the market. While, conventionally, image sensing devices with large numbers of pixels are accordingly large in size, in recent years, as pixels are made increasingly fine, image sensing devices have come to be made compact. Imaging lens systems that are used with image sensing devices with fine pixels are required to have high resolution proportionate to the fineness of pixels.

The resolution of a lens is limited by its f-number, and the smaller the f-number, that is, the faster the lens, the higher resolution can be obtained, hence the demand for fast imaging lens systems. On the other hand, to make imaging optical devices more compact, imaging lens systems are required to have shorter total lengths. Elaborating the power arrangement, lens thicknesses, and aerial distances does make imaging lens systems more compact, but not beyond a certain limit. In recent years, therefore, there have been made attempts to shorten the total length of the optical system by use of a wide-angle lens system, that is, an imaging lens system with a shorter focal length. As imaging lens systems for such uses, there have been proposed imaging lens systems of a five-element design for the reason that they can be adapted for higher performance than those of a three- or four-element design.

As such imaging lens systems of a five-element design, Patent Documents 1 and 2 disclose imaging lens systems that are composed of, from the object side, a first lens element having a positive optical power, a second lens element having a negative optical power, a third lens element having a positive optical power, a fourth lens element having a positive optical power, and a fifth lens element having a negative optical power.

Patent Document 1: Japanese Patent Application Publication No. 2010-262269
Patent Document 2: Japanese Patent Application Publication No. 2012-8164

Inconveniently, however, with the imaging lens system disclosed in Patent Document 1, the interval between the second and third lens elements is so short that the beam that has exited from the second lens element enters the third lens element before diverging sufficiently, and this makes it impossible to sufficiently correct the coma aberration occurring in the second lens element. With the imaging lens system disclosed in Patent Document 2, the object-side curvature of the third lens element is so small that it is impossible to sufficiently correct the coma aberration occurring in the off-axial beam.

SUMMARY OF THE INVENTION

Devised against the background discussed above, the present invention aims to provide an imaging lens system of a five-element design with a fast f-number that despite having a shortened total length has satisfactorily corrected aberrations.

To achieve the above object, according to one aspect of the invention, an imaging lens system for imaging a subject image on the image sensing surface of an image sensing device is provided with, from the object side, an aperture stop, a first lens element having a positive optical power and convex to the object side, a second lens element having a negative optical power, a third lens element having a positive optical power and convex to the object side, a fourth lens element having a positive optical power and having a meniscus shape convex to the image side, and a fifth lens element having a negative optical power and having a biconcave shape. Here, the image-side surface of the fifth lens element has, on a sectional plane including an optical axis, a point, other than the intersection with the optical axis, at which the tangent line is perpendicular to the optical axis. Moreover, conditional formulae (1) to (4) below are fulfilled:

$$0.8 < f/f1 < 1.30 \tag{1}$$

$$0.5 < f4/f1 < 0.90 \tag{2}$$

$$0.6 < d4/d3 < 2.0 \tag{3}$$

$$0.80 < R3\_1/f < 2.20 \tag{4}$$

where
- f represents the focal length of the entire imaging lens system;
- f1 represents the focal length of the first lens element;
- f4 represents the focal length of the fourth lens element;
- d3 represents the axial thickness of the second lens element;
- d4 represents the axial aerial distance between the second and third lens elements; and
- R3_1 represents the radius of curvature of the object-side surface of the third lens element on the optical axis.

According to another aspect of the invention, an imaging optical device is provided with an imaging lens system as described above and an image sensing device for converting an optical image formed on an image sensing surface into an electrical signal. Here, the imaging lens system is arranged such that an optical image of a subject is formed on the image sensing surface of the image sensing device.

According to yet another aspect of the invention, a digital device is provided with an imaging optical device as described above so as to be additionally equipped with at least one of a function of taking a still picture of the subject or a function of taking a moving picture of the subject.

BRIEF DESCRIPTION OF THE DRAWINGS

FIGS. 2A to 2E are aberration diagrams of Example 1;

FIG. 3 is an optical construction diagram of a second embodiment (Example 2) of the invention;

FIGS. 4A to 4E are aberration diagrams of Example 2;

FIG. 5 is an optical construction diagram of a third embodiment (Example 3) of the invention;

FIGS. 6A to 6E are aberration diagrams of Example 3;

FIGS. 8A to 8E are aberration diagrams of Example 4;

FIGS. 10A to 10E are aberration diagrams of Example 5; and

DETAILED DESCRIPTION OF PREFERRED EMBODIMENTS

Figure 1:
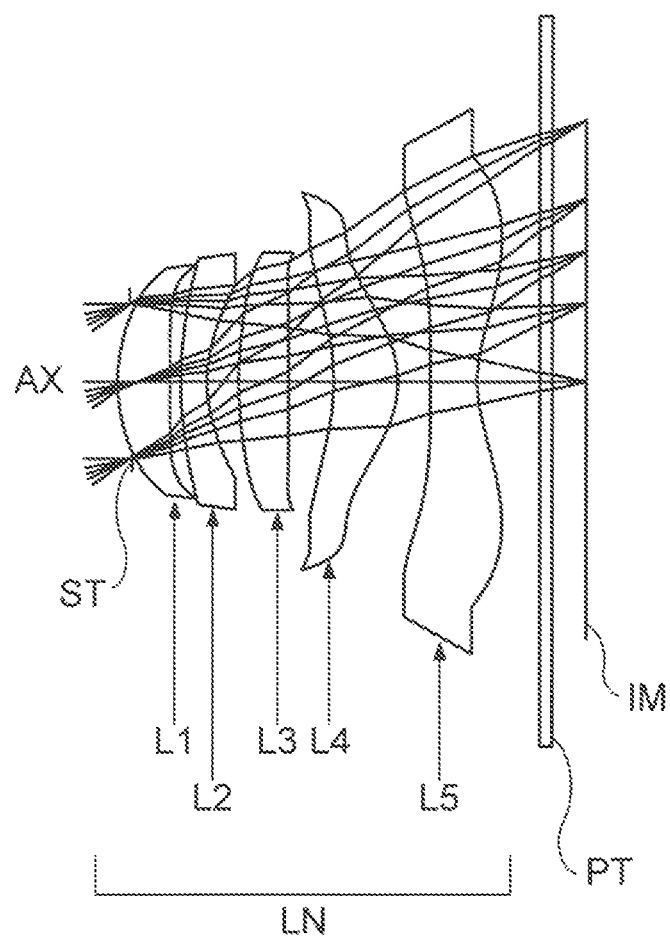
FIG. 1 is an optical construction diagram of a first embodiment (Example 1) of the invention.
Figure 7:
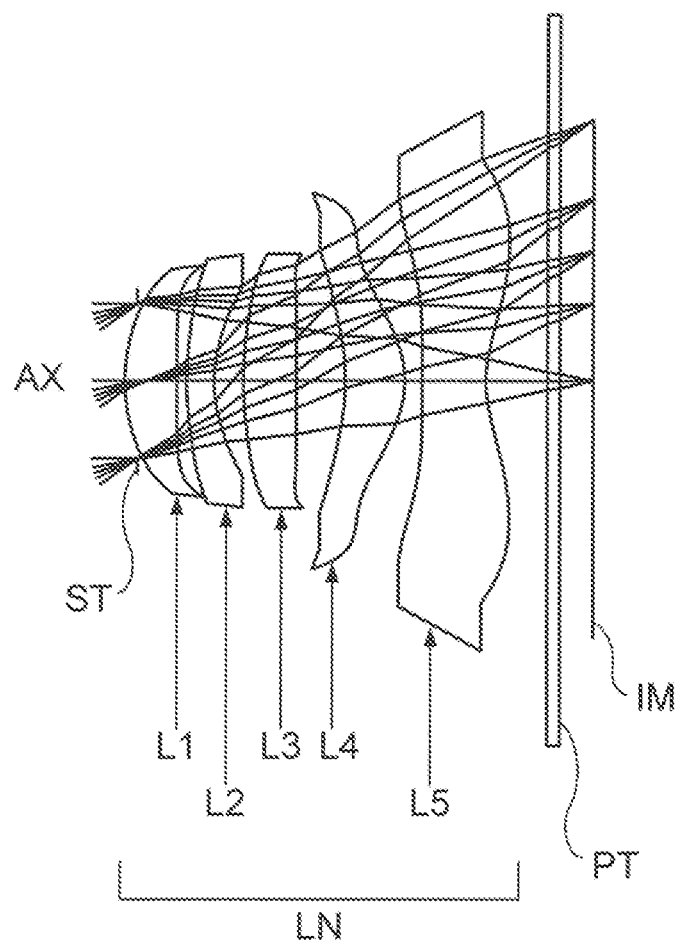
FIG. 7 is an optical construction diagram of a fourth embodiment (Example 4) of the invention.
Figure 9:
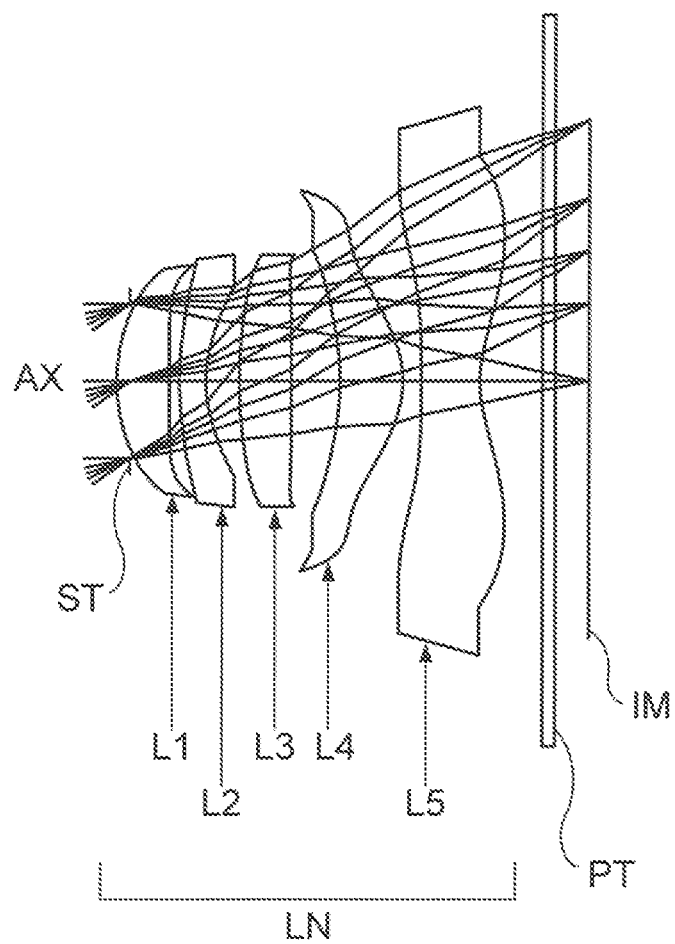
FIG. 9 is an optical construction diagram of a fifth embodiment (Example 5) of the invention.

Hereinafter, imaging lens systems etc. according to the present invention will be described. An imaging lens system according to the invention is an imaging lens system for imaging a subject image on the image sensing surface of an image sensing device (for example, the photoelectric conversion portion of a solid-state image sensing device), and is characterized in that it is composed of, from the object side, an aperture stop, a first lens element having a positive optical power and convex to the object side, a second lens element having a negative optical power, a third lens element having a positive optical power and convex to the object side, a fourth lens element having a positive optical power and having a meniscus shape convex to the image side, and a fifth lens element having a negative optical power and having a biconcave shape; that the image-side surface of the fifth lens element has, on a sectional place including the optical axis, a point, other than the intersection with the optical axis, at which the tangent line is perpendicular to the optical axis; and that conditional formulae (1) to (4) below are fulfilled.

$$0.8 < f/f1 < 1.30 \quad (1)$$

$$0.5 < f4/f1 < 0.90 \quad (2)$$

$$0.6 < d4/d3 < 2.0 \quad (3)$$

$$0.80 < R3\_1/f < 2.20 \quad (4)$$

where
 f represents the focal length of the entire imaging lens system;
 f1 represents the focal length of the first lens element;
 f4 represents the focal length of the fourth lens element;
 d3 represents the axial thickness of the second lens element;
 d4 represents the axial aerial distance between the second and third lens elements; and
 R3_1 represents the radius of curvature of the object-side surface of the third lens element on the optical axis.

Here, as a criterion for compact lens systems, it is aimed at to be so compact as to fulfill conditional formula (A1) below. Fulfilling conditional formula (A1) makes it possible to make an imaging optical device as a whole compact and lightweight.

$$L/2Y' < 0.96 \quad (A1)$$

where
 L represents the distance from the most object-side lens surface in the entire imaging lens system to the image-side focal point along the optical axis; and
 2Y' represents the diagonal length of the image sensing surface of the image sensing device (for example, the diagonal length of the rectangular effective pixel region of a solid-state image sensing device).

Here, the image-side focal point denotes the image point observed when parallel rays parallel to the optical axis enter the imaging lens system. In a case where a plane-parallel plate, such as an optical low-pass filter, an infrared cut filter, and the seal glass of the package of the solid-state image sensing device, is arranged between the most image-side surface in the imaging lens system and the image-side focal point position, it is assumed that the value of L above is calculated by using the air-equivalent distance of the part corresponding to the plane-parallel plate.

Within the range defined by conditional formula (A1) above, the range defined by conditional formula (A2) below is further preferable.

$$L/2Y' < 0.92 \quad (A2)$$

In recent years, with the rapid spread of smart phones and tablet terminals, further compactness has been sought in the imaging optical devices incorporated in them. Accordingly, it is aimed at to give imaging optical devices fulfilling conditional formula (A1) or (A2) above a height of 5.0 mm or less, and further preferably a height of 4.5 mm or less.

To obtain a compact imaging lens system with satisfactorily corrected aberrations, a basic construction according to the invention is composed of a first lens element having a positive optical power and convex to the object side, a second lens element having a negative optical power, a third lens element having a positive optical power, a fourth lens element having a positive optical power and convex to the image side, and a fifth lens element having a negative optical power and having a biconcave shape. This lens construction, composed of, from the object side, a positively powered lens group—composed of the first, second, third, and fourth lens elements—and the fifth lens element having a negative optical power, forms a so-called telephoto-type arrangement (an optical power is the quantity defined as the reciprocal of a focal length), and thus is a construction advantageous to reducing the total length of an imaging lens system. Moreover, using two or more negative lens elements in a five-element design and thereby increasing the number of surfaces having a diverging effect makes the correction of the Petzval sum easy, and thus makes it possible to obtain an imaging lens system that offers satisfactory imaging performance even in a peripheral part of the image area. Moreover, giving the fifth lens element a biconcave shape makes it possible to give it a strong negative refractive power, and this helps enhance the total length reducing effect of the above-mentioned telephoto-type arrangement.

Arranging the aperture stop at the most object-side position in the imaging lens system makes it possible to prevent too small a distance between the entrance pupil and the image sensing surface, and thereby to obtain satisfactory telecentricity. Giving the fourth lens element a meniscus shape convex to the image side makes it easy to correct the coma aberration occurring in the second lens element having a negative optical power. Forming the image-side surface of the fifth lens element into an aspherical shape makes it possible to satisfactorily correct aberrations in a peripheral part of the image area. Moreover, Forming it into an aspherical shape having an inflection point at a position other than the intersection with the optical axis makes it easy to obtain telecentricity in the image-side beam. Here, an "inflection point" denotes, with respect to a curve describing the sectional shape of a lens element within the effective radius, a point on an aspherical surface at which the tangent plane to the aspherical surface is perpendicular to the optical axis. In the present invention, the sign of the paraxial optical power of each surface is determined by the sign of the spherical surface as observed when a best-fit spherical surface is taken in the optically effective region. That is, a spherical surface is considered that fits best not only in terms of the axial optical power but with respect to the effective region including an off-axial part and, for example, if it has a concave shape, it is taken as a negative surface.

Conditional formula (1) defines the ratio between the focal length of the entire optical system and the focal length of the first lens element. Above the upper limit of conditional formula (1), the optical power of the first lens element is so high that it is difficult to correct the optical path difference between the axial and off-axial beams resulting from the lowered profile, leading to increased curvature of field. Also, the variation in curvature of field that accompanies focusing is so large that it is difficult to maintain satisfactory performance from infinity to the closest distance. Below the lower limit of conditional formula (1), the focal length of the first lens element is so long that it is impossible to secure a sufficient distance between the principal plane of the optical system to the image plane, making it difficult to lower the profile. Also, the optical powers of the third and fourth lens elements, which are far from the aperture stop, may be so high as to result in increased curvature of field (for example, with the image plane inclined to the under side).

Conditional formula (2) defines the ratio between the focal lengths of the first and fourth lens elements. Above the upper limit of conditional formula (2), the axial optical power of the fourth lens element is so low that it is difficult to correct the difference in curvature of field between low and high image heights. Below the lower limit of conditional formula (2), the optical power of the fourth lens element is so high as to result in curvature of field inclined to the under side and increased astigmatism at off-axial image heights.

Conditional formula (3) defines the aerial distance between the second and third lens elements. Above the upper limit of conditional formula (3), the distance between the second and third lens elements is so long as to result in a small beam width in the off-axial light at the object-side surface of the third lens element, making it impossible to sufficiently correct the coma aberration occurring in the second lens element. Below the lower limit of conditional formula (3), the distance between the second and third lens elements is so short as to result in a large beam width in the off-axial beam exiting as convergent light from the second lens element as observed on the object-side surface of the third lens element, resulting in overcorrection of the coma aberration occurring in the second lens element.

Conditional formula (4) defines the ratio between the radius of curvature of the object-side surface of the third lens element and the focal length of the entire optical system. Above the upper limit of conditional formula (4), the radius of curvature of the object-side surface of the third lens element is so large that it is difficult to correct the coma aberration that occurs as a result of the swinging up of the off-axial beam by the second lens element. Below the lower limit of conditional formula (4), the radius of curvature of the object-side surface of the third lens element is so small as to result in large variation in curvature of field as the incidence position of the off-axial beam varies with focusing, making it difficult to realize satisfactory performance in a wide range of object distance.

With the distinctive construction described above, it is possible to realize an imaging lens system of a five-element design with a fast f-value that despite having a shorter total length has satisfactorily corrected aberrations, and to realize an imaging optical device provided with such an imaging lens system. By employing the imaging optical device in digital devices such as cellular phones and portable information terminals, it is possible to add a high-performance image input function to the digital devices on a compact fashion, and to contribute to making them compact, high-performance, versatile, and otherwise improving them. Conditions etc. for obtaining those benefits in a good balance and for achieving higher optical performance, further compactness, etc. will be described below.

It is preferable that at least one of conditional formulae (1a) to (4a) below be fulfilled.

$$1.00 < f/f1 < 1.25 \quad (1a)$$

$$0.7 < f4/f1 < 0.85 \quad (2a)$$

$$0.9 < d4/d3 < 1.4 \quad (3a)$$

$$0.95 < R3\_1/f < 1.6 \quad (4a)$$

These conditional formulae (1a) to (4a) define, within the conditional ranges defined by conditional formulae (1) to (4) above, conditional ranges further preferable from the above-mentioned and other viewpoints. Accordingly, preferably, fulfilling at least one of conditional formulae (1a) to (4a) helps obtain the above-mentioned benefits more effectively.

It is preferable that conditional formula (5) below be fulfilled.

$$0.73 < f\_12/f3 < 1.50 \quad (5)$$

where
  f_12 represents the composite focal length of the first and second lens elements; and
  f3 represents the focal length of the third lens element.

Conditional formula (5) defines the ratio between the composite focal length of the first and second lens elements and the focal length of the third lens element. Above the upper limit of conditional formula (5), the optical power of the third lens element is so high as to result in large variation in curvature of field as the incidence position of the off-axial beam varies with focusing. Below the lower limit of conditional formula (5), the optical power of third lens element is so low that it is difficult to correct the coma aberration occurring in the second lens element.

It is further preferable that conditional formula (5a) below be fulfilled.

$$0.85 < f\_12/f3 < 1.30 \quad (5a)$$

This conditional formula (5a) defines, within the conditional range defined by conditional formula (5) above, a conditional range further preferable from the above-mentioned and other viewpoints. Accordingly, preferably, fulfilling conditional formula (5a) helps obtain the above-mentioned benefits more effectively.

It is preferable that the image-side surface of the third lens element have a negative optical power in a peripheral part. Giving the image-side surface of the third lens element a negative optical power in a peripheral part makes it possible to swing up the off-axial beam at two stages, namely at the second and third lens elements respectively. This is effective to lowering the profile of the optical system. Also, it is possible to distribute the negative optical power, and thus to reduce aberrations (for example, coma aberration) produced.

It is preferable that conditional formula (6) below be fulfilled.

$$0.25 < f4/f3 < 0.8 \quad (6)$$

where f3 represents the focal length of the third lens element; and
f4 represents the focal length of the fourth lens element.

Conditional formula (6) defines the ratio between the focal lengths of the third and fourth lens elements. Above the upper limit of conditional formula (6), the axial optical power of the third lens element is so large that it is difficult for the third lens element to have the action of swinging up the off-axial beam in a peripheral part. As a result, the action of diverging the beam needs to borne chiefly by the second lens element, and this may result in increased coma aberration. Below the lower limit of conditional formula (6), the axial optical power of the third lens element is so small that, to lower the profile, it is necessary to increase the axial optical power of the fourth lens element. This increases local variation in the optical power of the fourth lens element, that is, the difference between the axial and peripheral optical power of the fourth lens element, resulting in large deterioration in performance observed as the incidence position of the beam on the fourth lens element varies with focusing. For example, increased curvature of field results, leading to degraded performance, and coma aberration occurs, leading to a lower modulation transfer function.

It is further preferable that conditional formula (6a) below be fulfilled.

$$0.28 < f4/f3 < 0.50 \quad (6a)$$

This conditional formula (6a) defines, within the conditional range defined by conditional formula (6) above, a conditional range further preferable from the above-mentioned and other viewpoints. Accordingly, preferably, fulfilling conditional formula (6a) helps obtain the above-mentioned benefits more effectively.

It is preferable that the object-side surface of the third lens element have a positive curvature that increases from its intersection with the optical axis to a peripheral part. That is, it is preferable that the object-side surface of the third lens element have a positive curvature that increases the farther away from the optical axis (that is, the closer to a peripheral part). Giving the object-side surface of the third lens element such a curvature makes it possible to satisfactorily correct the coma aberration that occurs as a result of the swinging up of the off-axial beam for profile lowering.

It is preferable that conditional formula (7) below be fulfilled.

$$20 < v1 - v2 < 70 \quad (7)$$

where v1 represents the Abbe number of the first lens element; and
v2 represents the Abbe number of the second lens element.

Conditional formula (7) defines a conditional range preferable for satisfactory correction of the chromatic aberrations in the entire imaging lens system. Above the lower limit of conditional formula (7), it is possible to correct axial, lateral, and other chromatic aberrations with a good balance. On the other hand, below the upper limit of conditional formula (7), it is possible to build the lens system by using easily obtainable lens materials.

It is preferable that conditional formula (8) below be fulfilled.

$$1.60 < n2 < 2.10 \quad (8)$$

where n2 represents the refractive index for the d-line of the second lens element.

Conditional formula (8) defines a conditional range preferable for satisfactory correction of the chromatic aberrations and curvature of field in the entire imaging lens system. Above the lower limit of conditional formula (8), it is possible to give an appropriate refracting power to the second lens element, which has a comparatively high dispersion, and thus to satisfactorily correct chromatic aberrations and curvature of field. On the other hand, below the upper limit of conditional formula (8), it is possible to build the lens system by using easily obtainable lens materials.

It is further preferable that conditional formula (8a) below be fulfilled.

$$1.60 < n2 < 2.00 \quad (8a)$$

This conditional formula (8a) defines, within the conditional range defined by conditional formula (8) above, a conditional range further preferable from the above-mentioned and other viewpoints. Accordingly, preferably, fulfilling conditional formula (8a) helps obtain the above-mentioned benefits more effectively.

It is preferable that all the lens elements be formed of plastic materials. That is, it is preferable that the imaging lens system include plastic lens elements alone as lens elements. In recent years, with a view to reducing the size of entire imaging optical devices incorporating solid-state image sensing devices, there have been developed solid-state image sensing devices with smaller pixel pitches and hence with smaller image sensing surface sizes despite having the same number of pixels. With an imaging lens system for such solid-state image sensing devices with smaller image sensing surface sizes, the focal length of the entire system needs to be relatively short, and this makes the radii of curvature and outer diameters of the individual lens elements considerably small. Thus, by using as all the lens elements plastic lens elements, which are fabricated by injection molding, instead of glass lens elements, which are fabricated through troublesome polishing, it is possible to inexpensively mass-produce even lens elements with small radii of curvature and outer diameters. Moreover, plastic lens elements allow lower pressing temperatures, and thus help alleviate the wear of the molds. It is thus possible to reduce the frequency of replacement and maintenance of the molds, and thus to reduce costs.

Imaging lens systems according to the invention are suitable as imaging lens systems for use in digital devices (for example, portable terminals) equipped with an image input function, and by combining them with image sensing devices and the like, it is possible to build imaging optical devices that optically capture an image of a subject and output it as an electrical signal. An imaging optical device is an optical device that constitutes a main component of cameras that are used for the taking of still and moving pictures of a subject, and is composed of, from the object side (that is, the subject side), an imaging lens system which forms an optical image of an object, and an image sensing device which converts the optical image formed by the imaging lens system into an electrical signal. By arranging the imaging lens system having the distinctive construction described above in such a way that the optical image of the subject is formed on the light receiving surface (that is, the image sensing surface) of the image sensing device, it is possible to realize a compact, low-cost, and high-performance imaging optical device and a digital device provided with it.

Examples of digital devices equipped with an image input function include: cameras such as digital cameras, video cameras, surveillance cameras, vehicle-mounted cameras, and videophone cameras; and cameras incorporated in or externally fitted to personal computers, portable terminals (for example, compact and portable information device terminals such as cellular phones and mobile computers), peripheral devices to those (such as scanners and printers), and other digital devices. As these examples show, not only is it possible to build cameras by using imaging optical devices, it is also possible, by incorporating imaging optical devices into various devices, to add a camera function to them. For example, it is possible to build digital devices equipped with an image input function such as camera-equipped cellular phones.

Figure 11:
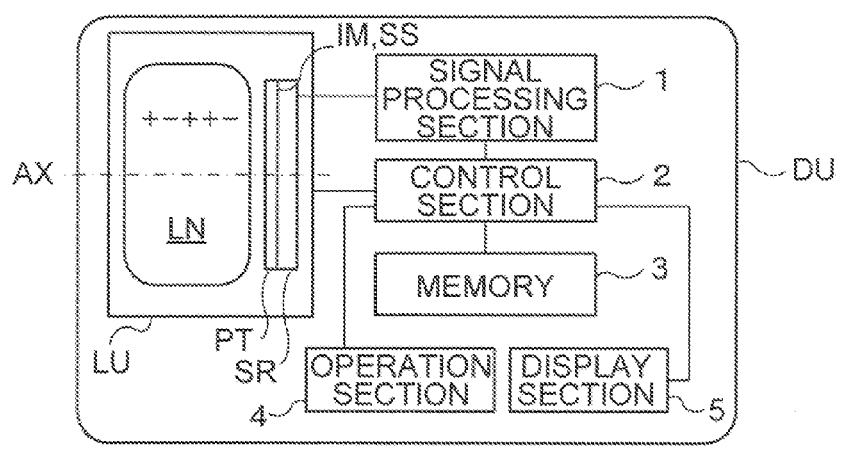
FIG. 11 is a schematic diagram showing an outline of the configuration of an example of a digital device incorporating an imaging lens system.

FIG. 11 is a schematic sectional view showing an outline of the configuration of a digital device DU as an example of a digital device equipped with an image input function. An imaging optical device LU incorporated in the digital device DU shown in FIG. 11 is provided with, from the object side (that is, the subject side), an imaging lens system LN which forms an optical image (image plane) 1M of an object (AX representing the optical axis), a plane-parallel plate PT (corresponding to the cover glass of an image sensing device SR and, as necessary, optical filters such as an optical low-pass filter and an infrared cut filter wherever these are provided), and an image sensing device SR which converts the optical image IM formed on a light receiving surface (image sensing surface) SS by the imaging lens system LN into an electrical signal. When a digital device DU equipped with an image input function is built by use of this imaging optical device LU, typically the imaging optical device LU is arranged inside its body; to realize a camera function, a configuration that suits the needs may be adopted. For example, an imaging optical device LU built as a unit may be configured so as to be detachably attached to, or rotatable relative to, the body of the digital device DU.

As described above, the imaging lens system LN is of a single-focus, five-element design composed of, from the object side, a first to a fifth lens element L1 to L5, and is configured to form an optical image IM on the light receiving surface SS of the image sensing device SR. Used as the image sensing device SR is a solid-state image sensing device having a plurality of pixels, such as a CCD image sensor or a CMOS image sensor. Since the imaging lens system LN is so arranged that the optical image IM of the subject is formed on the light receiving surface SS, which is the photoelectric conversion portion of the image sensing device SR, the optical image IM formed by the imaging lens system LN is converted into an electrical signal by the image sensing device SR.

The digital device DU is provided with, in addition to the imaging optical device LU, a signal processing section 1, a control section 2, a memory 3, an operation section 4, a display section 5, etc. The signal produced by the image sensing device SR is subjected to predetermined digital image processing, image compression processing, etc. in the signal processing section 1, and the resulting digital video signal is recorded to the memory 3 (such as a semiconductor memory or an optical disc) and, as the case may be, transmitted to another device (for example, the communication function of a cellular phone) across a cable or after being converted into an infrared signal or the like. The control section 2 includes a microprocessor, and performs, in a concentrated fashion, the control of image taking functions (a still picture taking function, a moving picture taking function, etc.), image playback functions, and other functions; the control of a lens moving mechanism for focusing; and other control. For example, so that at least either the taking of a still picture or a moving picture of a subject is performed, the control section 2 controls the imaging optical device LU. The display section 5 is a portion that includes a display such as a liquid crystal monitor, and performs image display by using the image signal resulting from conversion by the image sensing device SR or image information recorded on the control section 2. The operation section 4 is a portion that includes operated members such as operation buttons (for example, a shutter release button), an operation dial (for example, a taking mode dial), etc., and conveys the information input through operation by the operator to the control section 2.

Next, by way of a first to a fifth embodiment of the invention, specific optical constructions for the imaging lens system LN will be described. FIGS. 1, 3, 5, 7, and 9 show a first to a fifth embodiment, respectively, of the imaging lens system LN in its condition focused at infinity, along with the optical path, in an optical section. A j-th lens element is the lens element located in the j-th position counted from the object side, and a plane-parallel plate PT arranged to the image side of the imaging lens system LN is assumed to be an optical low-pass filter, an IR cut filter, the seal glass of a solid-state image sensing device, etc. All the lens surfaces constituting the imaging lens system LN are aspherical surfaces, and for all the lens elements, plastic materials are assumed to be the optical materials. The adjustment of the focal point as in automatic focusing, macro switching, etc. is assumed to be achieved through overall focusing involving the movement of the first to fifth lens elements L1 to L5 all together.

In the imaging lens system LN of the first to fifth embodiments, there are arranged, from the object side, an aperture stop ST, a positive first lens element L1, a negative second lens element L2, a positive third lens element L3, a positive fourth lens element L4, and a negative fifth lens element L5. In all the embodiments, the first and third lens elements L1 and L3 have a shape convex to the object side, the fourth lens element L4 has a meniscus shape convex to the image side, and the fifth lens element L5 has a biconcave shape.

The image-side surface of the fifth lens element has, in a sectional plane including the optical axis AX, a point, other than the intersection with the optical axis AX, at which the tangent line is perpendicular to the optical axis AX. That is, the image-side surface of the fifth lens element is an aspherical surface that has an inflection point at a position other than the intersection with the optical axis AX. Moreover, at the most object-side position in the imaging lens system LN, the aperture stop ST is arranged. Arranging the aperture stop ST at the most object-side position in the lens system prevents too close a distance between the entrance pupil and the light receiving surface SS, and thus makes it possible to realize satisfactory telecentricity.

Incidentally, in recent years, as a method of mounting imaging optical devices at low cost and in large quantities, there has been proposed a technology according to which a board having solder potted on it beforehand is, with IC (integrated circuit) chips and other electronic components and optical components placed on it, subjected to a reflow process (heat treatment process) so as to melt the solder and thereby mount the electronic components and optical components on the board simultaneously.

To achieve mounting by a reflow process as described above, it is necessary to heat optical components along with electronic components to about 200 to 260 degrees Celsius. Inconveniently, however, at such high temperatures, lens elements using thermoplastic resin are thermally deformed or discolored to have degraded optical performance. As one way to solve the inconvenience, there has been proposed a technology according to which glass-molded lens elements with superb resistance to heat are employed to achieve compactness combined with optical performance in a high-temperature environment. Inconveniently, however, that proves to be costlier than employing lens elements using thermoplastic resin, and thus cannot meet the demand for low-cost imaging optical devices.

In a case where energy-curable resin is used as a material for the imaging lens system (here, energy-curable resin may be thermosetting or ultraviolet-curing resin), compared with in cases where thermoplastic resin such as polycarbonate- or polyolefin-based resin is used, the imaging lens system exposed to high temperature exhibits less deterioration in optical performance, and this is effective to a reflow process. In addition, fabrication is easier and less costly than with glass-molded lens elements, and this makes it possible to simultaneously reduce the cost and improve the mass-producibility of the imaging optical device that incorporates the imaging lens system. As plastic lens elements used in imaging lens systems LN according to the invention, those formed of energy-curable resin may be used.

In the embodiments described above and in the practical examples described below, the design is not necessarily such that the principal ray incidence angle of the beam incident on the image sensing surface of the solid-state image sensing device is sufficiently small in a peripheral part of the image sensing surface. However, in recent technologies, the arrangement of the color filters and the on-chip microlens array of the solid-state image sensing device has been reviewed so as to reduce shading. Specifically, setting the arrangement pitch of the color filters and the on-chip microlens array slightly smaller than the pixel pitch on the image sensing surface of the image sensing device allows the color filters and the on-chip microlens array to shift, with respect to the pixels, toward the optical axis the more the closer to a peripheral part of the sensing surface, and this makes it possible to guide the obliquely incident beam efficiently to the light receiving portion of the individual pixels. In this way, it is possible to suppress the shading occurring in the solid-state image sensing device. The practical examples presented below are examples of designs aimed at further compactness in exchange for the slackening of the requirements mentioned above.

EXAMPLES

Hereinafter, the construction and other features of imaging lens systems embodying the present invention will be presented more specifically with reference to the construction data etc. of practical examples. Examples 1 to 5 (EX1 to EX5) presented below are numerical examples corresponding to the first to fifth embodiments, respectively, described above, and the optical construction diagrams (FIGS. 1, 3, 5, 7, and 9) showing the first to fifth embodiments also show the configuration, optical path, etc. of the corresponding ones of Examples 1 to 5 respectively.

In the construction data of each practical example, listed as surface data are, from the leftmost column rightward, the surface number, the radius of curvature r (mm), the axial surface-to-surface distance t (mm), the refractive index nd for the d-line (with a wavelength of 587.56 nm), the Abbe number for the d-line vd, and the effective radius (mm) A surface whose surface number is marked with an asterisk (*) is an aspherical surface, whose surface shape is defined by formula (AS) below in the local rectangular coordinate system (X, Y, Z) with its origin at the vertex of the surface. Listed as aspherical surface data are the aspherical surface coefficients etc. In the aspherical surface data of each practical example, any missing term has a coefficient of 0, and throughout the data, "E–n" stands for "×$10^{-n}$."

$$X = \frac{h^2/R}{1+\sqrt{1-(1+K)h^2/R^2}} + \sum A_i h^i \qquad (AS)$$

where
 h represents the height in the direction perpendicular to the X axis (the optical axis AX) ($h^2=Y^2+Z^2$);
 X represents the amount of sag in the direction of the optical axis AX at the height h (with respect to the vertex);
 R represents the reference radius of curvature (corresponding to the radius of curvature r);
 K represents the conic constant; and
 Ai represents the aspherical surface coefficient of order i.

Listed as miscellaneous data are the focal length of the entire system (f, mm), the back focus (fB, mm), the f-number (F), the diagonal length of the image sensing surface SS of the image sensing device SR (2Y', mm; with Y' representing the maximum image height), the entrance pupil position (ENTP, the distance from the first surface to the entrance pupil position, mm), the exit pupil position (EXTP, the distance from the image sensing surface SS to the exit pupil position, mm), the front principal point position (H1, the distance from the first surface to the front principal point position, mm), and the rear principal point position (H2, the distance from the last surface to the rear principal point position, mm) The back focus is assumed to refer to the distance from the image-side surface of the plane-parallel plate PT to the image plane IM. Listed as single lens element data is the focal length (mm) of each lens element (Lj, j=1 to 5). Table 1 shows the values corresponding to the conditional formulae in each practical example.

FIGS. 2A to 2E, 4A to 4E, 6A to 6E, 8A to 8E, and 10A to 10E are aberration diagrams of Examples 1 to 5 (EX1 to EX5) respectively, the diagrams with the suffix "A" showing spherical aberration (mm), those with the suffix "B" showing astigmatism (mm), those with the suffix "C" showing distortion (%), and those with the suffixes "D" and "E" showing meridional coma aberration (mm). In the aberration diagrams with the suffixes "A", "D," and "E," a solid line indicates the amount of aberration for the d-line (with a wavelength of 587.56 nm), a short-dash line indicates the amount of aberration for the C-line (with a wavelength of 656.28 nm), and a long-dash line indicate the amount of aberration for the g-line (with a wavelength of 435.84 nm).

In the spherical aberration diagrams with the suffix "A," the amounts of spherical aberration for the different wavelengths are indicated as the amounts of deviation in the direction of the optical axis AX, with the vertical axis representing the f-number. In the astigmatism diagrams with the suffix "B," a four-dots-and-dash line T indicates the meridional image plane for the d-line, and a solid line S indicates the sagittal image plane for the d-line, each as the amount of deviation from the paraxial image plane in the direction of the optical axis AX, with the vertical axis representing the image height Y'. In the distortion diagrams with the suffix "C," the horizontal axis represents the distortion for the d-line, and the vertical axis represents the image height Y'. In the coma aberration diagrams with the suffixes "D" and "E," the amounts of meridional coma aberration for the different wavelengths at the image height Y' are indicated. The image height Y' corresponds to one-half of the diagonal length of the image sensing surface SS of the image sensing device SR.

The imaging lens system LN (FIG. 1) of Example 1 is composed of, from the object side, an aperture stop ST, a positive first lens element L1, a negative second lens element L2, a positive third lens element L3, a positive fourth lens element L4, and a negative fifth lens element L5, and all the lens surfaces are aspherical surfaces. In terms of the paraxial surface shape, the first lens element L1 is a biconvex positive lens element, the second lens element L2 is a negative meniscus lens element concave to the image side, the third lens element L3 is a biconvex positive lens element, the fourth lens element L4 is a positive meniscus lens element convex to the image side, and the fifth lens element L5 is a biconcave negative lens element.

The imaging lens system LN (FIG. 3) of Example 2 is composed of, from the object side, an aperture stop ST, a positive first lens element L1, a negative second lens element L2, a positive third lens element L3, a positive fourth lens element L4, and a negative fifth lens element L5, and all the lens surfaces are aspherical surfaces. In terms of the paraxial surface shape, the first lens element L1 is a biconvex positive lens element, the second lens element L2 is a negative meniscus lens element concave to the image side, the third lens element L3 is a biconvex positive lens element, the fourth lens element L4 is a positive meniscus lens element convex to the image side, and the fifth lens element L5 is a biconcave negative lens element.

The imaging lens system LN (FIG. 5) of Example 3 is composed of, from the object side, an aperture stop ST, a positive first lens element L1, a negative second lens element L2, a positive third lens element L3, a positive fourth lens element L4, and a negative fifth lens element L5, and all the lens surfaces are aspherical surfaces. In terms of the paraxial surface shape, the first lens element L1 is a biconvex positive lens element, the second lens element L2 is a negative meniscus lens element concave to the image side, the third lens element L3 is a planoconvex lens element convex to the object side, the fourth lens element L4 is a positive meniscus lens element convex to the image side, and the fifth lens element L5 is a biconcave negative lens element.

The imaging lens system LN (FIG. 7) of Example 4 is composed of, from the object side, an aperture stop ST, a positive first lens element L1, a negative second lens element L2, a positive third lens element L3, a positive fourth lens element L4, and a negative fifth lens element L5, and all the lens surfaces are aspherical surfaces. In terms of the paraxial surface shape, the first lens element L1 is a biconvex positive lens element, the second lens element L2 is a negative meniscus lens element concave to the image side, the third lens element L3 is a biconvex positive lens element, the fourth lens element L4 is a positive meniscus lens element convex to the image side, and the fifth lens element L5 is a biconcave negative lens element.

The imaging lens system LN (FIG. 9) of Example 5 is composed of, from the object side, an aperture stop ST, a positive first lens element L1, a negative second lens element L2, a positive third lens element L3, a positive fourth lens element L4, and a negative fifth lens element L5, and all the lens surfaces are aspherical surfaces. In terms of the paraxial surface shape, the first lens element L1 is a biconvex positive lens element, the second lens element L2 is a negative meniscus lens element concave to the image side, the third lens element L3 is a biconvex positive lens element, the fourth lens element L4 is a positive meniscus lens element convex to the image side, and the fifth lens element L5 is a biconcave negative lens element.

Example 1

Unit: mm

Surface Data

| Surface No. | r | t | nd | vd | Effective Radius |
|---|---|---|---|---|---|
| 1 (Aperture) | ∞ | −0.11 | | | 0.68 |
| 2* | 1.601 | 0.46 | 1.54470 | 56.2 | 0.75 |
| 3* | −52.308 | 0.09 | | | 0.77 |
| 4* | 2.555 | 0.23 | 1.63470 | 23.9 | 0.81 |
| 5* | 1.174 | 0.28 | | | 0.84 |
| 6* | 3.562 | 0.43 | 1.54470 | 56.2 | 0.98 |
| 7* | −79.760 | 0.40 | | | 1.05 |
| 8* | −2.023 | 0.56 | 1.54470 | 56.2 | 1.16 |
| 9* | −0.828 | 0.29 | | | 1.31 |
| 10* | −33.108 | 0.41 | 1.54470 | 56.2 | 1.69 |
| 11* | 1.094 | 0.55 | | | 1.98 |
| 12 | ∞ | 0.11 | 1.51630 | 64.1 | 2.70 |
| 13 | ∞ | | | | 2.70 |

Aspherical Surface Data

Surface 2

K = 0.42980E+00
A4 = 0.88209E-02
A6 = −0.22884E-01
A8 = 0.99955E-01
A10 = −0.20350E-01
A12 = 0.00000E+00
A14 = 0.00000E+00

Surface 3

K = −0.30000E+02
A4 = 0.53259E-01
A6 = 0.39459E-01
A8 = 0.11810E+00
A10 = 0.00000E+00
A12 = 0.00000E+00
A14 = 0.00000E+00

Surface 4

K = −0.24111E+02
A4 = −0.77925E-01
A6 = 0.17032E+00
A8 = −0.81416E-01
A10 = 0.00000E+00
A12 = 0.00000E+00
A14 = 0.00000E+00

Surface 5

K = −0.31704E+01
A4 = −0.12692E+00
A6 = 0.37367E+00
A8 = −0.37843E+00
A10 = 0.15856E+00
A12 = 0.00000E+00
A14 = 0.00000E+00

Surface 6

K = 0.36090E+01
A4 = −0.37223E-01
A6 = −0.37403E-01
A8 = 0.91073E-01
A10 = −0.29671E-01
A12 = 0.00000E+00
A14 = 0.00000E+00

Surface 7

K = 0.25296E+02
A4 = 0.14300E-01
A6 = 0.96969E-02

-continued

Unit: mm

|     |               |
|-----|---------------|
| A8 = | −0.10020E+00 |
| A10 = | 0.81413E−01 |
| A12 = | 0.00000E+00 |
| A14 = | 0.00000E+00 |

Surface 8

|     |               |
|-----|---------------|
| K = | −0.20943E+02 |
| A4 = | −0.24710E+00 |
| A6 = | 0.52088E+00 |
| A8 = | −0.47233E+00 |
| A10 = | 0.20566E+00 |
| A12 = | −0.35669E−01 |
| A14 = | 0.00000E+00 |

Surface 9

|     |               |
|-----|---------------|
| K = | −0.36289E+01 |
| A4 = | −0.19124E+00 |
| A6 = | 0.23722E+00 |
| A8 = | −0.62971E−01 |
| A10 = | 0.00000E+00 |
| A12 = | 0.00000E+00 |
| A14 = | 0.00000E+00 |

Surface 10

|     |               |
|-----|---------------|
| K = | 0.26758E+02 |
| A4 = | −0.51750E−01 |
| A6 = | −0.36361E−02 |
| A8 = | 0.85850E−02 |
| A10 = | −0.13589E−02 |
| A12 = | 0.00000E+00 |
| A14 = | 0.00000E+00 |

Surface 11

|     |               |
|-----|---------------|
| K = | −0.79207E+01 |
| A4 = | −0.65028E−01 |
| A6 = | 0.13152E−01 |
| A8 = | −0.29180E−02 |
| A10 = | 0.24724E−03 |
| A12 = | 0.00000E+00 |
| A14 = | 0.00000E+00 |

Miscellaneous Data

|     |         |
|-----|---------|
| f = | 3.24 mm |
| fB = | 0.30 mm |
| F = | 2.40 |
| 2Y' = | 4.570 mm |
| ENTP = | 0.00 mm |
| EXTP = | −2.35 mm |
| H1 = | −0.73 mm |
| H2 = | −2.95 mm |

Single Lens Element Data

| Lens Element | Starting Surface | Focal Length |
|---|---|---|
| 1 | 2 | 2.848 |
| 2 | 4 | −3.623 |
| 3 | 6 | 6.245 |
| 4 | 8 | 2.199 |
| 5 | 10 | −1.928 |

Example 2

Unit: mm

Surface Data

| Surface No. | r | t | nd | vd | Effective Radius |
|---|---|---|---|---|---|
| 1 (Aperture) | ∞ | −0.11 | | | 0.68 |
| 2* | 1.595 | 0.46 | 1.54470 | 56.2 | 0.74 |
| 3* | −51.611 | 0.09 | | | 0.77 |
| 4* | 2.596 | 0.23 | 1.63470 | 23.9 | 0.81 |
| 5* | 1.185 | 0.28 | | | 0.85 |
| 6* | 3.488 | 0.43 | 1.54470 | 56.2 | 1.03 |
| 7* | −100.000 | 0.42 | | | 1.09 |
| 8* | −2.076 | 0.54 | 1.54470 | 56.2 | 1.22 |
| 9* | −0.830 | 0.21 | | | 1.42 |
| 10* | −100.000 | 0.49 | 1.54470 | 56.2 | 1.78 |
| 11* | 1.055 | 0.56 | | | 2.09 |
| 12 | ∞ | 0.11 | 1.51630 | 64.1 | 2.70 |
| 13 | ∞ | | | | 2.70 |

Aspherical Surface Data

Surface 2

|     |               |
|-----|---------------|
| K = | 0.40950E+00 |
| A4 = | 0.73193E−02 |
| A6 = | −0.20965E−01 |
| A8 = | 0.91052E−01 |
| A10 = | −0.12670E−01 |
| A12 = | 0.00000E+00 |
| A14 = | 0.00000E+00 |

Surface 3

|     |               |
|-----|---------------|
| K = | 0.30000E+02 |
| A4 = | 0.53274E−01 |
| A6 = | 0.34692E−01 |
| A8 = | 0.11872E+00 |
| A10 = | 0.00000E+00 |
| A12 = | 0.00000E+00 |
| A14 = | 0.00000E+00 |

Surface 4

|     |               |
|-----|---------------|
| K = | −0.23724E+02 |
| A4 = | −0.75902E−01 |
| A6 = | 0.16927E+00 |
| A8 = | −0.79608E−01 |
| A10 = | 0.00000E+00 |
| A12 = | 0.00000E+00 |
| A14 = | 0.00000E+00 |

Surface 5

|     |               |
|-----|---------------|
| K = | −0.29883E+01 |
| A4 = | −0.13077E+00 |
| A6 = | 0.37353E+00 |
| A8 = | −0.37387E+00 |
| A10 = | 0.15652E+00 |
| A12 = | 0.00000E+00 |
| A14 = | 0.00000E+00 |

Surface 6

|     |               |
|-----|---------------|
| K = | 0.33098E+01 |
| A4 = | −0.35098E−01 |
| A6 = | −0.31970E−01 |
| A8 = | 0.75298E−01 |
| A10 = | −0.18796E−01 |
| A12 = | 0.00000E+00 |
| A14 = | 0.00000E+00 |

Surface 7

|     |               |
|-----|---------------|
| K = | 0.30000E+02 |
| A4 = | 0.13173E−01 |
| A6 = | −0.20301E−01 |
| A8 = | −0.42832E−01 |
| A10 = | 0.19297E−01 |
| A12 = | 0.27915E−01 |
| A14 = | 0.00000E+00 |

Surface 8

|     |               |
|-----|---------------|
| K = | −0.21186E+02 |
| A4 = | −0.21390E+00 |
| A6 = | 0.40736E+00 |
| A8 = | −0.33640E+00 |
| A10 = | 0.11599E+00 |
| A12 = | −0.11876E−01 |
| A14 = | 0.00000E+00 |

-continued

Unit: mm

Surface 9

| | |
|---|---|
| K = | −0.38096E+01 |
| A4 = | −0.18968E+00 |
| A6 = | 0.23028E+00 |
| A8 = | −0.61004E−01 |
| A10 = | 0.00000E+00 |
| A12 = | 0.00000E+00 |
| A14 = | 0.00000E+00 |

Surface 10

| | |
|---|---|
| K = | −0.30000E+02 |
| A4 = | −0.75032E−01 |
| A6 = | 0.97472E−02 |
| A8 = | 0.63551E−02 |
| A10 = | −0.13521E−02 |
| A12 = | 0.00000E+00 |
| A14 = | 0.00000E+00 |

Surface 11

| | |
|---|---|
| K = | −0.78932E+01 |
| A4 = | −0.67887E−01 |
| A6 = | 0.14750E−01 |
| A8 = | −0.31805E−02 |
| A10 = | 0.24926E−03 |
| A12 = | 0.00000E+00 |
| A14 = | 0.00000E+00 |

Miscellaneous Data

| | |
|---|---|
| f = | 3.24 mm |
| fB = | 0.30 mm |
| F = | 2.40 |
| 2Y' = | 4.570 mm |
| ENTP = | 0.00 mm |
| EXTP = | −2.33 mm |
| H1 = | −0.75 mm |
| H2 = | −2.94 mm |

Single Lens Element Data

| Lens Element | Starting Surface | Focal Length |
|---|---|---|
| 1 | 2 | 2.836 |
| 2 | 4 | −3.632 |
| 3 | 6 | 6.170 |
| 4 | 8 | 2.191 |
| 5 | 10 | −1.905 |

Example 3

Unit: mm

Surface Data

| Surface No. | r | t | nd | vd | Effective Radius |
|---|---|---|---|---|---|
| 1 (Aperture) | ∞ | −0.08 | | | 0.67 |
| 2* | 1.617 | 0.44 | 1.54470 | 56.2 | 0.70 |
| 3* | −35.570 | 0.08 | | | 0.74 |
| 4* | 2.582 | 0.25 | 1.63470 | 23.9 | 0.78 |
| 5* | 1.185 | 0.30 | | | 0.82 |
| 6* | 3.343 | 0.52 | 1.54470 | 56.2 | 1.01 |
| 7* | ∞ | 0.38 | | | 1.09 |
| 8* | −2.540 | 0.51 | 1.54470 | 56.2 | 1.20 |
| 9* | −0.900 | 0.27 | | | 1.42 |
| 10* | −14.025 | 0.42 | 1.54470 | 56.2 | 1.77 |
| 11* | 1.103 | 0.39 | | | 2.05 |
| 12 | ∞ | 0.11 | 1.51630 | 64.1 | 2.69 |
| 13 | ∞ | | | | 2.69 |

-continued

Unit: mm

Aspherical Surface Data

Surface 2

| | |
|---|---|
| K = | −0.18760E+00 |
| A4 = | 0.14549E−01 |
| A6 = | 0.19494E−01 |
| A8 = | 0.56187E−02 |
| A10 = | 0.46160E−01 |
| A12 = | 0.00000E+00 |
| A14 = | 0.00000E+00 |

Surface 3

| | |
|---|---|
| K = | 0.30000E+02 |
| A4 = | 0.38662E−01 |
| A6 = | 0.65704E−01 |
| A8 = | 0.53345E−01 |
| A10 = | 0.00000E+00 |
| A12 = | 0.00000E+00 |
| A14 = | 0.00000E+00 |

Surface 4

| | |
|---|---|
| K = | −0.30000E+02 |
| A4 = | −0.24868E−01 |
| A6 = | 0.90383E−01 |
| A8 = | −0.37249E−01 |
| A10 = | 0.00000E+00 |
| A12 = | 0.00000E+00 |
| A14 = | 0.00000E+00 |

Surface 5

| | |
|---|---|
| K = | −0.44349E+01 |
| A4 = | −0.17664E−01 |
| A6 = | 0.21352E+00 |
| A8 = | −0.25978E+00 |
| A10 = | 0.12652E+00 |
| A12 = | 0.00000E+00 |
| A14 = | 0.00000E+00 |

Surface 6

| | |
|---|---|
| K = | 0.12292E+01 |
| A4 = | −0.42827E−01 |
| A6 = | −0.14330E−01 |
| A8 = | 0.80643E−01 |
| A10 = | −0.29765E−01 |
| A12 = | 0.00000E+00 |
| A14 = | 0.00000E+00 |

Surface 7

| | |
|---|---|
| K = | 0.30000E+02 |
| A4 = | −0.11281E−01 |
| A6 = | −0.59065E−02 |
| A8 = | −0.97819E−01 |
| A10 = | 0.83569E−01 |
| A12 = | 0.49802E−02 |
| A14 = | 0.00000E+00 |

Surface 8

| | |
|---|---|
| K = | −0.27616E+02 |
| A4 = | −0.15121E+00 |
| A6 = | 0.34017E+00 |
| A8 = | −0.33746E+00 |
| A10 = | 0.11903E+00 |
| A12 = | −0.87391E−02 |
| A14 = | 0.00000E+00 |

Surface 9

| | |
|---|---|
| K = | −0.43995E+01 |
| A4 = | −0.17666E+00 |
| A6 = | 0.29436E+00 |
| A8 = | −0.13816E+00 |
| A10 = | 0.27266E−01 |
| A12 = | −0.26192E−02 |
| A14 = | 0.00000E+00 |

-continued

Unit: mm

Surface 10

| | |
|---|---|
| K = | −0.30000E+02 |
| A4 = | −0.10529E+00 |
| A6 = | 0.16859E−01 |
| A8 = | 0.18599E−01 |
| A10 = | −0.71467E−02 |
| A12 = | 0.73345E−03 |
| A14 = | 0.00000E+00 |

Surface 11

| | |
|---|---|
| K = | −0.79993E+01 |
| A4 = | −0.95924E−01 |
| A6 = | 0.31756E−01 |
| A8 = | −0.84557E−02 |
| A10 = | 0.11084E−02 |
| A12 = | −0.50391E−04 |
| A14 = | 0.00000E+00 |

Miscellaneous Data

| | |
|---|---|
| f = | 3.28 mm |
| fB = | 0.43 mm |
| F = | 2.40 |
| 2Y' = | 4.570 mm |
| ENTP = | 0.00 mm |
| EXTP = | −2.09 mm |
| H1 = | −1.00 mm |
| H2 = | −2.85 mm |

Single Lens Element Data

| Lens Element | Starting Surface | Focal Length |
|---|---|---|
| 1 | 2 | 2.840 |
| 2 | 4 | −3.671 |
| 3 | 6 | 6.111 |
| 4 | 8 | 2.297 |
| 5 | 10 | −1.851 |

Example 4

Unit: mm

Surface Data

| Surface No. | r | t | nd | vd | Effective Radius |
|---|---|---|---|---|---|
| 1 (Aperture) | ∞ | −0.11 | | | 0.68 |
| 2* | 1.578 | 0.46 | 1.54470 | 56.2 | 0.74 |
| 3* | −86.865 | 0.08 | | | 0.77 |
| 4* | 2.527 | 0.24 | 1.63470 | 23.9 | 0.81 |
| 5* | 1.166 | 0.26 | | | 0.84 |
| 6* | 3.310 | 0.46 | 1.54470 | 56.2 | 0.97 |
| 7* | −100.000 | 0.42 | | | 1.05 |
| 8* | −1.991 | 0.52 | 1.54470 | 56.2 | 1.22 |
| 9* | −0.831 | 0.15 | | | 1.42 |
| 10* | −100.000 | 0.56 | 1.54470 | 56.2 | 1.74 |
| 11* | 1.056 | 0.54 | | | 2.06 |
| 12 | ∞ | 0.11 | 1.51630 | 64.1 | 2.70 |
| 13 | ∞ | | | | 2.70 |

Aspherical Surface Data

Surface 2

| | |
|---|---|
| K = | 0.21700E−01 |
| A4 = | 0.14366E−01 |
| A6 = | 0.67420E−03 |
| A8 = | 0.31765E−01 |
| A10 = | 0.34131E−01 |
| A12 = | 0.00000E+00 |
| A14 = | 0.00000E+00 |

-continued

Unit: mm

Surface 3

| | |
|---|---|
| K = | 0.30000E+02 |
| A4 = | 0.28747E−01 |
| A6 = | 0.13141E+00 |
| A8 = | −0.11212E+00 |
| A10 = | 0.16655E+00 |
| A12 = | 0.00000E+00 |
| A14 = | 0.00000E+00 |

Surface 4

| | |
|---|---|
| K = | −0.30000E+02 |
| A4 = | −0.36929E−01 |
| A6 = | 0.12569E+00 |
| A8 = | −0.52372E−01 |
| A10 = | 0.00000E+00 |
| A12 = | 0.00000E+00 |
| A14 = | 0.00000E+00 |

Surface 5

| | |
|---|---|
| K = | −0.47814E+01 |
| A4 = | −0.21287E−02 |
| A6 = | 0.17588E+00 |
| A8 = | −0.15071E+00 |
| A10 = | 0.47996E−01 |
| A12 = | 0.00000E+00 |
| A14 = | 0.00000E+00 |

Surface 6

| | |
|---|---|
| K = | 0.11770E+01 |
| A4 = | −0.50905E−01 |
| A6 = | 0.12710E−01 |
| A8 = | −0.47292E−01 |
| A10 = | 0.15521E+00 |
| A12 = | −0.78405E−01 |
| A14 = | 0.00000E+00 |

Surface 7

| | |
|---|---|
| K = | 0.30000E+02 |
| A4 = | 0.56426E−02 |
| A6 = | 0.92641E−02 |
| A8 = | −0.11959E+00 |
| A10 = | 0.82236E−01 |
| A12 = | 0.20207E−01 |
| A14 = | 0.00000E+00 |

Surface 8

| | |
|---|---|
| K = | −0.20995E+02 |
| A4 = | −0.20850E+00 |
| A6 = | 0.45618E+00 |
| A8 = | −0.43036E+00 |
| A10 = | 0.17365E+00 |
| A12 = | −0.23368E−01 |
| A14 = | 0.00000E+00 |

Surface 9

| | |
|---|---|
| K = | −0.39250E+01 |
| A4 = | −0.17675E+00 |
| A6 = | 0.24592E+00 |
| A8 = | −0.78493E−01 |
| A10 = | 0.37650E−02 |
| A12 = | 0.00000E+00 |
| A14 = | 0.00000E+00 |

Surface 10

| | |
|---|---|
| K = | −0.30000E+02 |
| A4 = | −0.80996E−01 |
| A6 = | −0.26784E−02 |
| A8 = | 0.21283E−01 |
| A10 = | −0.60467E−02 |
| A12 = | 0.46572E−03 |
| A14 = | 0.00000E+00 |

Surface 11

| | |
|---|---|
| K = | −0.81482E+01 |
| A4 = | −0.74752E−01 |
| A6 = | 0.18115E−01 |

-continued

| Unit: mm | |
|---|---|
| A8 = | −0.41843E−02 |
| A10 = | 0.39799E−03 |
| A12 = | 0.00000E+00 |
| A14 = | 0.00000E+00 |

| Miscellaneous Data | |
|---|---|
| f = | 3.25 mm |
| fB = | 0.30 mm |
| F = | 2.40 |
| 2Y' = | 4.570 mm |
| ENTP = | 0.00 mm |
| EXTP = | −2.28 mm |
| H1 = | −0.85 mm |
| H2 = | −2.96 mm |

Single Lens Element Data

| Lens Element | Starting Surface | Focal Length |
|---|---|---|
| 1 | 2 | 2.838 |
| 2 | 4 | −3.631 |
| 3 | 6 | 5.867 |
| 4 | 8 | 2.248 |
| 5 | 10 | −1.906 |

Example 5

| Unit: mm | | | | | |
|---|---|---|---|---|---|
| Surface Data | | | | | |
| Surface No. | r | t | nd | vd | Effective Radius |
| 1 (Aperture) | ∞ | −0.11 | | | 0.68 |
| 2* | 1.584 | 0.46 | 1.54470 | 56.2 | 0.74 |
| 3* | −26.600 | 0.09 | | | 0.77 |
| 4* | 2.584 | 0.23 | 1.63470 | 23.9 | 0.80 |
| 5* | 1.171 | 0.29 | | | 0.84 |
| 6* | 3.877 | 0.46 | 1.54470 | 56.2 | 1.00 |
| 7* | −100.000 | 0.42 | | | 1.07 |
| 8* | −2.441 | 0.55 | 1.54470 | 56.2 | 1.20 |
| 9* | −0.854 | 0.16 | | | 1.40 |
| 10* | −100.000 | 0.52 | 1.54470 | 56.2 | 1.80 |
| 11* | 1.037 | 0.55 | | | 2.10 |
| 12 | ∞ | 0.11 | 1.51630 | 64.1 | 2.70 |
| 13 | ∞ | | | | 2.70 |

Aspherical Surface Data

Surface 2

| | |
|---|---|
| K = | 0.46260E+00 |
| A4 = | 0.45262E−02 |
| A6 = | −0.23344E−01 |
| A8 = | 0.94489E−01 |
| A10 = | −0.16927E−01 |
| A12 = | 0.00000E+00 |
| A14 = | 0.00000E+00 |

Surface 3

| | |
|---|---|
| K = | 0.28218E+02 |
| A4 = | 0.59211E−01 |
| A6 = | 0.33090E−01 |
| A8 = | 0.11297E+00 |
| A10 = | 0.00000E+00 |
| A12 = | 0.00000E+00 |
| A14 = | 0.00000E+00 |

Surface 4

| | |
|---|---|
| K = | −0.22401E+02 |
| A4 = | −0.75719E−01 |
| A6 = | 0.17672E+00 |
| A8 = | −0.90738E−01 |
| A10 = | 0.00000E+00 |
| A12 = | 0.00000E+00 |
| A14 = | 0.00000E+00 |

Surface 5

| | |
|---|---|
| K = | −0.28112E+01 |
| A4 = | −0.13406E+00 |
| A6 = | 0.38027E+00 |
| A8 = | −0.38075E+00 |
| A10 = | 0.16039E+00 |
| A12 = | 0.00000E+00 |
| A14 = | 0.00000E+00 |

Surface 6

| | |
|---|---|
| K = | 0.76546E+01 |
| A4 = | −0.35377E−01 |
| A6 = | −0.39113E−01 |
| A8 = | 0.88318E−01 |
| A10 = | −0.30666E−01 |
| A12 = | 0.00000E+00 |
| A14 = | 0.00000E+00 |

Surface 7

| | |
|---|---|
| K = | −0.30000E+02 |
| A4 = | 0.73346E−02 |
| A6 = | −0.19396E−01 |
| A8 = | −0.42205E−01 |
| A10 = | 0.24064E−01 |
| A12 = | 0.23689E−01 |
| A14 = | 0.00000E+00 |

Surface 8

| | |
|---|---|
| K = | −0.29729E+02 |
| A4 = | −0.19297E+00 |
| A6 = | 0.30092E+00 |
| A8 = | −0.21363E+00 |
| A10 = | 0.40735E−01 |
| A12 = | 0.70424E−02 |
| A14 = | 0.00000E+00 |

Surface 9

| | |
|---|---|
| K = | −0.40894E+01 |
| A4 = | −0.20443E+00 |
| A6 = | 0.22485E+00 |
| A8 = | −0.57643E−01 |
| A10 = | 0.00000E+00 |
| A12 = | 0.00000E+00 |
| A14 = | 0.00000E+00 |

Surface 10

| | |
|---|---|
| K = | 0.30000E+02 |
| A4 = | −0.12286E+00 |
| A6 = | 0.60396E−01 |
| A8 = | −0.10410E−01 |
| A10 = | 0.56099E−03 |
| A12 = | 0.00000E+00 |
| A14 = | 0.00000E+00 |

Surface 11

| | |
|---|---|
| K = | −0.76986E+01 |
| A4 = | −0.79815E−01 |
| A6 = | 0.22668E−01 |
| A8 = | −0.48968E−02 |
| A10 = | 0.41456E−03 |
| A12 = | 0.00000E+00 |
| A14 = | 0.00000E+00 |

Miscellaneous Data

| | |
|---|---|
| f = | 3.26 mm |
| fB = | 0.30 mm |
| F = | 2.40 |
| 2Y' = | 4.570 mm |
| ENTP = | 0.00 mm |
| EXTP = | −2.34 mm |

-continued

Unit: mm

| | |
|---|---|
| H1 = | −0.77 mm |
| H2 = | −2.96 mm |

Single Lens Element Data

| Lens Element | Starting Surface | Focal Length |
|---|---|---|
| 1 | 2 | 2.750 |
| 2 | 4 | −3.569 |
| 3 | 6 | 6.834 |
| 4 | 8 | 2.139 |
| 5 | 10 | −1.873 |

TABLE 1

| | Conditional Formula | Example 1 | Example 2 | Example 3 | Example 4 | Example 5 |
|---|---|---|---|---|---|---|
| (1) | $0.8 < f/f1 < 1.30$ | 1.14 | 1.14 | 1.15 | 1.14 | 1.18 |
| (2) | $0.5 < f4/f1 < 0.90$ | 0.77 | 0.77 | 0.81 | 0.79 | 0.78 |
| (3) | $0.6 < d4/d3 < 2.0$ | 1.21 | 1.21 | 1.20 | 1.07 | 1.26 |
| (4) | $0.80 < R3\_1/f < 2.20$ | 1.10 | 1.08 | 1.02 | 1.02 | 1.19 |
| (5) | $0.73 < f\_12/f3 < 1.50$ | 1.15 | 1.15 | 1.15 | 1.20 | 0.98 |
| (6) | $0.25 < f4/f3 < 0.8$ | 0.35 | 0.36 | 0.38 | 0.38 | 0.31 |
| (7) | $20 < v1 - v2 < 70$ | 32.29 | 32.29 | 32.29 | 32.29 | 32.29 |
| (8) | $1.60 < n2 < 2.10$ | 1.635 | 1.635 | 1.635 | 1.635 | 1.635 |

What is claimed is:

1. An imaging lens system for imaging a subject image on an image sensing surface of an image sensing device, the imaging lens system comprising, from an object side:

an aperture stop;
a first lens element having a positive optical power and convex to the object side;
a second lens element having a negative optical power;
a third lens element having a positive optical power and convex to the object side;
a fourth lens element having a positive optical power and having a meniscus shape convex to the image side; and
a fifth lens element having a negative optical power and having a biconcave shape, wherein
an image-side surface of the fifth lens element has, on a sectional plane including an optical axis, a point, other than an intersection with the optical axis, at which a tangent line is perpendicular to the optical axis,
conditional formulae (1) to (4) below are fulfilled:

$$0.8 < f/f1 < 1.30 \quad (1)$$

$$0.5 < f4/f1 < 0.90 \quad (2)$$

$$0.6 < d4/d3 < 2.0 \quad (3)$$

$$0.80 < R3\_1/f < 2.20 \quad (4)$$

where
f represents a focal length of the entire imaging lens system;
f1 represents a focal length of the first lens element;
f4 represents a focal length of the fourth lens element;
d3 represents an axial thickness of the second lens element;
d4 represents an axial aerial distance between the second and third lens elements; and
R3_1 represents a radius of curvature of the object-side surface of the third lens element on the optical axis; and
wherein an image-side surface of the third lens element has a negative optical power in a peripheral part.

2. The imaging lens system according to claim 1, wherein conditional formula (5) below is fulfilled:

$$0.73 < f\_12/f3 < 1.50 \quad (5)$$

where
f_12 represents a composite focal length of the first and second lens elements; and
f3 represents a focal length of the third lens element.

3. The imaging lens system according to claim 2, wherein an image-side surface of the third lens element has a negative optical power in a peripheral part.

4. The imaging lens system according to claim 2, wherein conditional formula (6) below is fulfilled:

$$0.25 < f4/f3 < 0.8 \quad (6)$$

where
f3 represents the focal length of the third lens element; and
f4 represents the focal length of the fourth lens element.

5. The imaging lens system according to claim 2, wherein an object-side surface of the third lens element has a positive curvature that increases from an intersection with the optical axis to a peripheral part.

6. The imaging lens system according to claim 2, wherein conditional formula (7) below is fulfilled:

$$20 < v1-v2 < 70 \quad (7)$$

where
v1 represents an Abbe number of the first lens element; and
v2 represents an Abbe number of the second lens element.

7. The imaging lens system according to claim 2, wherein conditional formula (8) below is fulfilled:

$$1.60 < n2 < 2.10 \quad (8)$$

where
n2 represents a refractive index for a d-line of the second lens element.

8. The imaging lens system according to claim 1, wherein conditional formula (6) below is fulfilled:

$$0.25 < f4/f3 < 0.8 \quad (6)$$

where
f3 represents a focal length of the third lens element; and
f4 represents the focal length of the fourth lens element.

9. The imaging lens system according to claim 8, wherein an object-side surface of the third lens element has a positive curvature that increases from an intersection with the optical axis to a peripheral part.

10. The imaging lens system according to claim 1, wherein conditional formula (7) below is fulfilled:

$$20 < v1-v2 < 70 \quad (7)$$

where
v1 represents an Abbe number of the first lens element; and
v2 represents an Abbe number of the second lens element.

11. The imaging lens system according to claim 1, wherein conditional formula (8) below is fulfilled:

$$1.60<n2<2.10 \quad (8)$$

where n2 represents a refractive index for a d-line of the second lens element.

12. The imaging lens system according to claim 1, wherein conditional formula (6) below is fulfilled:

$$0.25<f4/f3<0.8 \quad (6)$$

where f3 represents the focal length of the third lens element; and
f4 represents the focal length of the fourth lens element.

13. The imaging lens system according to claim 1, wherein an object-side surface of the third lens element has a positive curvature that increases from an intersection with the optical axis to a peripheral part.

14. The imaging lens system according to claim 1, wherein conditional formula (7) below is fulfilled:

$$20<v1-v2<70 \quad (7)$$

where v1 represents an Abbe number of the first lens element; and
v2 represents an Abbe number of the second lens element.

15. The imaging lens system according to claim 1, wherein conditional formula (8) below is fulfilled:

$$1.60<n2<2.10 \quad (8)$$

where n2 represents a refractive index for a d-line of the second lens element.

16. An imaging optical device comprising:

an imaging lens system for imaging a subject image on an image sensing surface of an image sensing device, the imaging lens system comprising, from an object side:
an aperture stop;
a first lens element having a positive optical power and convex to the object side;
a second lens element having a negative optical power;
a third lens element having a positive optical power and convex to the object side;
a fourth lens element having a positive optical power and having a meniscus shape convex to the image side; and
a fifth lens element having a negative optical power and having a biconcave shape,
wherein
an image-side surface of the fifth lens element has, on a sectional plane including an optical axis, a point, other than an intersection with the optical axis, at which a tangent line is perpendicular to the optical axis,
conditional formulae (1) to (4) below are fulfilled:

$$0.8<f/f1<1.30 \quad (1)$$

$$0.5<f4/f1<0.90 \quad (2)$$

$$0.6<d4/d3<2.0 \quad (3)$$

$$0.80<R3\_1/f<2.20 \quad (4)$$

where f represents a focal length of the entire imaging lens system;
f1 represents a focal length of the first lens element;
f4 represents a focal length of the fourth lens element;
d3 represents an axial thickness of the second lens element;
d4 represents an axial aerial distance between the second and third lens elements; and
R3_1 represents a radius of curvature of the object-side surface of the third lens element on the optical axis; and
wherein an image-side surface of the third lens element has a negative optical power in a peripheral part; and
an image sensing device for converting an optical image formed on an image sensing surface into an electrical signal,
wherein the imaging lens system is arranged such that an optical image of a subject is formed on the image sensing surface of the image sensing device.

17. An imaging optical device comprising:

an imaging lens system for imaging a subject image on an image sensing surface of an image sensing device, the imaging lens system comprising, from an object side:
an aperture stop;
a first lens element having a positive optical power and convex to the object side;
a second lens element having a negative optical power;
a third lens element having a positive optical power and convex to the object side;
a fourth lens element having a positive optical power and having a meniscus shape convex to the image side; and
a fifth lens element having a negative optical power and having a biconcave shape,
wherein
an image-side surface of the fifth lens element has, on a sectional plane including an optical axis, a point, other than an intersection with the optical axis, at which a tangent line is perpendicular to the optical axis,
conditional formulae (1) to (4) below are fulfilled:

$$0.8<f/f1<1.30 \quad (1)$$

$$0.5<f4/f1<0.90 \quad (2)$$

$$0.6<d4/d3<2.0 \quad (3)$$

$$0.80<R3\_1/f<2.20 \quad (4)$$

where f represents a focal length of the entire imaging lens system;
f1 represents a focal length of the first lens element;
f4 represents a focal length of the fourth lens element;
d3 represents an axial thickness of the second lens element;
d4 represents an axial aerial distance between the second and third lens elements; and
R3_1 represents a radius of curvature of the object-side surface of the third lens element on the optical axis; and
wherein an image-side surface of the third lens element has a negative optical power in a peripheral part; and
an image sensing device for converting an optical image formed on an image sensing surface into an electrical signal,
wherein the imaging lens system is arranged such that an optical image of a subject is formed on the image sensing surface of the image sensing device; so as to be additionally equipped with at least one of a function of taking a still picture of the subject or a function of taking a moving picture of the subject.

18. The digital device according to claim 17, wherein the digital device is a portable terminal.

19. An imaging lens system for imaging a subject image on an image sensing surface of an image sensing device, the imaging lens system comprising, from an object side:

an aperture stop;
a first lens element having a positive optical power and convex to the object side;
a second lens element having a negative optical power;
a third lens element having a positive optical power and convex to the object side;
a fourth lens element having a positive optical power and having a meniscus shape convex to the image side; and
a fifth lens element having a negative optical power and having a biconcave shape,
wherein
an image-side surface of the fifth lens element has, on a sectional plane including an optical axis, a point, other than an intersection with the optical axis, at which a tangent line is perpendicular to the optical axis,
conditional formulae (1) to (4) below are fulfilled:

$$0.8 < f/f1 < 1.30 \tag{1}$$

$$0.5 < f4/f1 < 0.90 \tag{2}$$

$$0.6 < d4/d3 < 2.0 \tag{3}$$

$$0.80 < R3\_1/f < 2.20 \tag{4}$$

where
f represents a focal length of the entire imaging lens system;
f1 represents a focal length of the first lens element;
f4 represents a focal length of the fourth lens element;
d3 represents an axial thickness of the second lens element;
d4 represents an axial aerial distance between the second and third lens elements; and
R3_1 represents a radius of curvature of the object-side surface of the third lens element on the optical axis; and
wherein an object-side surface of the third lens element has a positive curvature that increases from an intersection with the optical axis to a peripheral part.

20. An imaging optical device comprising:
an imaging lens system for imaging a subject image on an image sensing surface of an image sensing device, the imaging lens system comprising, from an object side:
an aperture stop;
a first lens element having a positive optical power and convex to the object side;
a second lens element having a negative optical power;
a third lens element having a positive optical power and convex to the object side;
a fourth lens element having a positive optical power and having a meniscus shape convex to the image side; and
a fifth lens element having a negative optical power and having a biconcave shape,
wherein
an image-side surface of the fifth lens element has, on a sectional plane including an optical axis, a point, other than an intersection with the optical axis, at which a tangent line is perpendicular to the optical axis,
conditional formulae (1) to (4) below are fulfilled:

$$0.8 < f/f1 < 1.30 \tag{1}$$

$$0.5 < f4/f1 < 0.90 \tag{2}$$

$$0.6 < d4/d3 < 2.0 \tag{3}$$

$$0.80 < R3\_1/f < 2.20 \tag{4}$$

where
f represents a focal length of the entire imaging lens system;
f1 represents a focal length of the first lens element;
f4 represents a focal length of the fourth lens element;
d3 represents an axial thickness of the second lens element;
d4 represents an axial aerial distance between the second and third lens elements; and
R3_1 represents a radius of curvature of the object-side surface of the third lens element on the optical axis; and
wherein an object-side surface of the third lens element has a positive curvature that increases from an intersection with the optical axis to a peripheral part; and
an image sensing device for converting an optical image formed on an image sensing surface into an electrical signal,
wherein the imaging lens system is arranged such that an optical image of a subject is formed on the image sensing surface of the image sensing device.

\* \* \* \* \*